(12) United States Patent
Sehn

(10) Patent No.: US 10,514,876 B2
(45) Date of Patent: Dec. 24, 2019

(54) GALLERY OF MESSAGES FROM INDIVIDUALS WITH A SHARED INTEREST

(71) Applicant: Snap Inc., Santa Monica, CA (US)

(72) Inventor: Timothy Michael Sehn, Marina Del Rey, CA (US)

(73) Assignee: Snap Inc., Santa Monica, CA (US)

( * ) Notice: Subject to any disclaimer, the term of this patent is extended or adjusted under 35 U.S.C. 154(b) by 616 days.

(21) Appl. No.: 15/137,608

(22) Filed: Apr. 25, 2016

(65) Prior Publication Data

US 2016/0239248 A1    Aug. 18, 2016

Related U.S. Application Data

(63) Continuation of application No. 14/578,258, filed on Dec. 19, 2014, now Pat. No. 9,385,983.

(51) Int. Cl.
*G06F 3/14* (2006.01)
*H04L 12/58* (2006.01)
(Continued)

(52) U.S. Cl.
CPC .............. *G06F 3/14* (2013.01); *G06F 3/0482* (2013.01); *G06F 3/0489* (2013.01);
(Continued)

(58) Field of Classification Search
CPC .. G06F 3/0482; G06F 3/0484; G06F 3/04883; G06F 3/04817; G06F 17/241; G06F 17/248; G06F 17/30268; G06F 17/3028; G06F 17/30477; G06F 17/30598; G06F 17/30781; G06F 17/3089; G06F 17/30893; G06F 17/30905; G06F 19/00; G06F 21/31; G06F 21/6272; G06F 21/64;
(Continued)

(56) References Cited

U.S. PATENT DOCUMENTS 5,999,932 A    12/1999  Paul
6,038,295 A     3/2000  Mattes
(Continued)

FOREIGN PATENT DOCUMENTS

CA       2887596 A1    7/2015
CA       2894332       8/2018
(Continued)

OTHER PUBLICATIONS

US 10,075,404 B1, 09/2018, Allen et al. (withdrawn)
(Continued)

*Primary Examiner* — David R Lazaro
(74) *Attorney, Agent, or Firm* — Schwegman Lundberg & Woessner, P.A.

(57) ABSTRACT

A machine includes a processor and a memory connected to the processor. The memory stores instructions executed by the processor to receive a message and a message parameter indicative of a characteristic of the message, where the message includes a photograph or a video. A determination is made that the message parameter corresponds to a selected gallery, where the selected gallery includes a sequence of photographs or videos. The message is posted to the selected gallery in response to the determination. The selected gallery is supplied in response to a request.

20 Claims, 6 Drawing Sheets

(51) Int. Cl.

| | | |
|---|---|---|
| *G06F 3/0482* | (2013.01) | |
| *G06F 3/0484* | (2013.01) | |
| *G06F 3/0488* | (2013.01) | |
| *G06F 3/0489* | (2013.01) | |
| *G06F 17/24* | (2006.01) | |
| *G06T 11/60* | (2006.01) | |
| *G11B 27/031* | (2006.01) | |
| *G11B 27/32* | (2006.01) | |

(52) U.S. Cl.
CPC ...... *G06F 3/04842* (2013.01); *G06F 3/04883* (2013.01); *G06F 17/241* (2013.01); *G06T 11/60* (2013.01); *G11B 27/031* (2013.01); *G11B 27/322* (2013.01); *H04L 51/10* (2013.01); *H04L 51/14* (2013.01); *H04L 51/32* (2013.01)

(58) Field of Classification Search
CPC .... G06F 21/645; G06F 2216/15; G06F 3/017; G06F 3/0481; G06F 3/04842; G06F 3/0486; G06F 3/04886; G06F 3/0489; G06F 3/1296; G06F 3/14; G06F 3/167; G06F 9/44505; G06F 9/451; G06F 9/45512
See application file for complete search history.

(56) References Cited

U.S. PATENT DOCUMENTS

| | | | |
|---|---|---|---|
| 6,154,764 A | 11/2000 | Nitta et al. | |
| 6,167,435 A | 12/2000 | Druckenmiller et al. | |
| 6,204,840 B1 | 3/2001 | Petelycky et al. | |
| 6,216,141 B1 | 4/2001 | Straub et al. | |
| 6,310,694 B1 | 10/2001 | Okimoto et al. | |
| 6,353,170 B1 | 3/2002 | Eyzaguirre et al. | |
| 6,484,196 B1 | 11/2002 | Maurille | |
| 6,499,016 B1* | 12/2002 | Anderson | H04N 1/00127 |
| | | | 704/275 |
| 6,665,531 B1 | 12/2003 | Soderbacka et al. | |
| 6,724,403 B1 | 4/2004 | Santoro et al. | |
| 6,757,713 B1 | 6/2004 | Ogilvie et al. | |
| 6,898,626 B2 | 5/2005 | Ohashi | |
| 6,980,909 B2 | 12/2005 | Root et al. | |
| 6,981,040 B1 | 12/2005 | Konig et al. | |
| 7,004,394 B2 | 2/2006 | Kim | |
| 7,027,124 B2 | 4/2006 | Foote et al. | |
| 7,124,164 B1 | 10/2006 | Chemtob | |
| 7,149,893 B1 | 12/2006 | Leonard et al. | |
| 7,173,651 B1 | 2/2007 | Knowles | |
| 7,203,380 B2 | 4/2007 | Chiu et al. | |
| 7,356,564 B2 | 4/2008 | Hartselle et al. | |
| 7,411,493 B2 | 8/2008 | Smith | |
| 7,519,670 B2 | 4/2009 | Hagale et al. | |
| 7,535,890 B2 | 5/2009 | Rojas | |
| 7,546,554 B2 | 6/2009 | Chiu et al. | |
| 7,778,973 B2 | 8/2010 | Choi | |
| 7,856,449 B1 | 12/2010 | Martino et al. | |
| 7,934,156 B2* | 4/2011 | Forstall | G06F 3/04883 |
| | | | 345/169 |
| 8,001,204 B2 | 8/2011 | Burtner et al. | |
| 8,098,904 B2 | 1/2012 | Loffe Sergey et al. | |
| 8,112,716 B2 | 2/2012 | Kobayashi | |
| 8,131,597 B2 | 3/2012 | Hudetz | |
| 8,199,747 B2 | 6/2012 | Rojas et al. | |
| 8,276,092 B1 | 9/2012 | Narayanan et al. | |
| 8,279,319 B2 | 10/2012 | Date | |
| 8,312,086 B2 | 11/2012 | Velusamy et al. | |
| 8,312,097 B1 | 11/2012 | Siegel et al. | |
| 8,332,475 B2 | 12/2012 | Rosen et al. | |
| 8,379,130 B2 | 2/2013 | Forutanpour et al. | |
| 8,405,773 B2 | 3/2013 | Hayashi et al. | |
| 8,418,067 B2 | 4/2013 | Cheng et al. | |
| 8,428,453 B1 | 4/2013 | Spiegel et al. | |
| 8,471,914 B2 | 6/2013 | Sakiyama et al. | |
| 8,560,612 B2 | 10/2013 | Kilmer et al. | |
| 8,686,962 B2* | 4/2014 | Christie | G06F 3/044 |
| | | | 345/173 |
| 8,687,021 B2 | 4/2014 | Bathiche et al. | |
| 8,718,333 B2 | 5/2014 | Wolf et al. | |
| 8,724,622 B2 | 5/2014 | Rojas | |
| 8,744,523 B2 | 6/2014 | Fan et al. | |
| 8,745,132 B2 | 6/2014 | Obradovich | |
| 8,775,401 B2 | 7/2014 | Zhou et al. | |
| 8,775,972 B2 | 7/2014 | Spiegel | |
| 8,788,680 B1 | 7/2014 | Naik | |
| 8,788,947 B2* | 7/2014 | Putz | G06F 3/0486 |
| | | | 715/748 |
| 8,797,415 B2 | 8/2014 | Arnold | |
| 8,856,349 B2 | 10/2014 | Jain et al. | |
| 8,874,677 B2 | 10/2014 | Rosen et al. | |
| 8,909,679 B2 | 12/2014 | Root et al. | |
| 8,909,725 B1 | 12/2014 | Sehn | |
| 8,914,752 B1 | 12/2014 | Spiegel | |
| 8,925,106 B1* | 12/2014 | Steiner | G06F 21/31 |
| | | | 726/28 |
| 8,995,433 B2 | 3/2015 | Rojas | |
| 9,026,943 B1 | 5/2015 | Spiegel | |
| 9,037,577 B1 | 5/2015 | Saylor et al. | |
| 9,040,574 B2 | 5/2015 | Wang et al. | |
| 9,055,416 B2 | 6/2015 | Rosen et al. | |
| 9,063,638 B1 | 6/2015 | Schrock et al. | |
| 9,083,770 B1 | 7/2015 | Dröse et al. | |
| 9,094,137 B1 | 7/2015 | Sehn et al. | |
| 9,098,832 B1 | 8/2015 | Scardino | |
| 9,100,806 B2 | 8/2015 | Rosen et al. | |
| 9,100,807 B2 | 8/2015 | Rosen et al. | |
| 9,113,301 B1 | 8/2015 | Spiegel et al. | |
| 9,191,776 B2 | 11/2015 | Root et al. | |
| 9,204,252 B2 | 12/2015 | Root | |
| 9,225,897 B1 | 12/2015 | Sehn | |
| 9,237,202 B1 | 1/2016 | Sehn | |
| 9,258,459 B2 | 2/2016 | Hartley | |
| 9,276,886 B1 | 3/2016 | Samaranayake | |
| 9,344,606 B2 | 5/2016 | Hartley et al. | |
| 9,385,983 B1 | 7/2016 | Sehn | |
| 9,396,354 B1 | 7/2016 | Murphy et al. | |
| 9,407,712 B1 | 8/2016 | Sehn | |
| 9,407,816 B1 | 8/2016 | Sehn | |
| 9,417,754 B2* | 8/2016 | Smith | G06F 3/0416 |
| 9,430,783 B1 | 8/2016 | Sehn | |
| 9,443,227 B2 | 9/2016 | Evans et al. | |
| 9,477,391 B2* | 10/2016 | Flynn, III | G06F 3/0488 |
| 9,489,661 B2 | 11/2016 | Evans et al. | |
| 9,491,134 B2 | 11/2016 | Rosen et al. | |
| 9,532,171 B2 | 12/2016 | Allen et al. | |
| 9,537,811 B2 | 1/2017 | Allen et al. | |
| 9,542,422 B2* | 1/2017 | Duggal | G06F 16/5866 |
| 9,693,191 B2 | 6/2017 | Sehn | |
| 9,825,898 B2 | 11/2017 | Sehn | |
| 9,854,219 B2 | 12/2017 | Sehn | |
| 10,133,705 B1 | 11/2018 | Allen et al. | |
| 10,182,311 B2 | 1/2019 | Sehn | |
| 10,200,813 B1 | 2/2019 | Allen et al. | |
| 10,284,508 B1 | 5/2019 | Allen et al. | |
| 10,311,916 B2 | 6/2019 | Sehn | |
| 10,416,845 B1 | 9/2019 | Allen et al. | |
| 10,448,201 B1 | 10/2019 | Sehn et al. | |
| 2001/0028787 A1 | 10/2001 | Nomura et al. | |
| 2002/0047868 A1 | 4/2002 | Miyazawa | |
| 2002/0078456 A1 | 6/2002 | Hudson et al. | |
| 2002/0122659 A1 | 9/2002 | Mcgrath et al. | |
| 2002/0128047 A1 | 9/2002 | Gates | |
| 2002/0144154 A1 | 10/2002 | Tomkow | |
| 2002/0171669 A1 | 11/2002 | Meron et al. | |
| 2003/0016247 A1 | 1/2003 | Lai et al. | |
| 2003/0017823 A1 | 1/2003 | Mager et al. | |
| 2003/0037124 A1 | 2/2003 | Yamaura et al. | |
| 2003/0052925 A1 | 3/2003 | Daimon et al. | |
| 2003/0101230 A1 | 5/2003 | Benschoter et al. | |
| 2003/0110503 A1 | 6/2003 | Perkes | |
| 2003/0126215 A1 | 7/2003 | Udell | |
| 2003/0164856 A1 | 9/2003 | Prager et al. | |

(56) References Cited

U.S. PATENT DOCUMENTS

| | | |
|---|---|---|
| 2004/0027371 A1 | 2/2004 | Jaeger |
| 2004/0064429 A1 | 4/2004 | Hirstius et al. |
| 2004/0111467 A1 | 6/2004 | Willis |
| 2004/0203959 A1 | 10/2004 | Coombes |
| 2004/0205480 A1 | 10/2004 | Moore |
| 2004/0205514 A1 | 10/2004 | Sommerer et al. |
| 2004/0243531 A1 | 12/2004 | Dean |
| 2004/0243688 A1 | 12/2004 | Wugofski |
| 2005/0071435 A1 | 3/2005 | Karstens |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2006/0004630 A1 | 1/2006 | Criddle et al. |
| 2006/0114338 A1 | 6/2006 | Rothschild |
| 2006/0127054 A1 | 6/2006 | Matsuyama |
| 2006/0242234 A1 | 10/2006 | Counts et al. |
| 2006/0265417 A1 | 11/2006 | Amato et al. |
| 2006/0270419 A1 | 11/2006 | Crowley et al. |
| 2007/0038715 A1 | 2/2007 | Collins et al. |
| 2007/0040931 A1 | 2/2007 | Nishizawa |
| 2007/0064899 A1 | 3/2007 | Boss et al. |
| 2007/0073823 A1 | 3/2007 | Cohen et al. |
| 2007/0082707 A1 | 4/2007 | Flynt et al. |
| 2007/0106706 A1 | 5/2007 | Ahrens et al. |
| 2007/0192128 A1 | 8/2007 | Celestini |
| 2007/0214216 A1 | 9/2007 | Carrer et al. |
| 2007/0233801 A1 | 10/2007 | Eren et al. |
| 2007/0243887 A1 | 10/2007 | Bandhole et al. |
| 2007/0255456 A1 | 11/2007 | Funayama |
| 2008/0025701 A1 | 1/2008 | Ikeda |
| 2008/0033930 A1 | 2/2008 | Warren |
| 2008/0046476 A1 | 2/2008 | Anderson |
| 2008/0049704 A1 | 2/2008 | Witteman et al. |
| 2008/0055269 A1 | 3/2008 | Lemay et al. |
| 2008/0062141 A1 | 3/2008 | Chandhri |
| 2008/0094387 A1 | 4/2008 | Chen |
| 2008/0104503 A1 | 5/2008 | Beall et al. |
| 2008/0207176 A1 | 8/2008 | Brackbill et al. |
| 2008/0208692 A1 | 8/2008 | Garaventi et al. |
| 2008/0222158 A1 | 9/2008 | Saika |
| 2008/0222545 A1 | 9/2008 | Lemay |
| 2008/0256446 A1 | 10/2008 | Yamamoto |
| 2008/0256577 A1 | 10/2008 | Funaki et al. |
| 2008/0263103 A1* | 10/2008 | McGregor .......... G06F 21/6218 |
| 2008/0266421 A1 | 10/2008 | Takahata et al. |
| 2008/0270938 A1 | 10/2008 | Carlson |
| 2008/0313346 A1 | 12/2008 | Kujawa et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0089678 A1 | 4/2009 | Sacco et al. |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0157752 A1 | 6/2009 | Gonzalez |
| 2009/0160970 A1 | 6/2009 | Fredlund et al. |
| 2009/0169062 A1 | 7/2009 | Cheung et al. |
| 2009/0177299 A1 | 7/2009 | Van De Sluis |
| 2009/0187825 A1 | 7/2009 | Sandquist et al. |
| 2009/0235155 A1 | 9/2009 | Ueda |
| 2009/0249222 A1 | 10/2009 | Schmidt et al. |
| 2009/0265647 A1 | 10/2009 | Martin et al. |
| 2009/0284658 A1 | 11/2009 | Cho |
| 2010/0011316 A1 | 1/2010 | Sar et al. |
| 2010/0039505 A1 | 2/2010 | Inoue et al. |
| 2010/0073509 A1 | 3/2010 | Shioji |
| 2010/0082693 A1 | 4/2010 | Hugg et al. |
| 2010/0100729 A1 | 4/2010 | Read et al. |
| 2010/0115281 A1 | 5/2010 | Camenisch et al. |
| 2010/0131880 A1 | 5/2010 | Lee et al. |
| 2010/0131895 A1 | 5/2010 | Wohlert |
| 2010/0156933 A1 | 6/2010 | Jones et al. |
| 2010/0159944 A1 | 6/2010 | Pascal et al. |
| 2010/0161635 A1 | 6/2010 | Dey |
| 2010/0161831 A1 | 6/2010 | Haas et al. |
| 2010/0183280 A1 | 7/2010 | Beauregard et al. |
| 2010/0185665 A1 | 7/2010 | Horn et al. |
| 2010/0185987 A1 | 7/2010 | Yang et al. |
| 2010/0191631 A1 | 7/2010 | Weidmann |
| 2010/0199227 A1* | 8/2010 | Xiao .................... G06F 3/0481 715/863 |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0251143 A1 | 9/2010 | Thomas et al. |
| 2010/0257196 A1 | 10/2010 | Waters et al. |
| 2010/0273463 A1 | 10/2010 | Bonnefoy et al. |
| 2010/0281045 A1 | 11/2010 | Dean |
| 2010/0293105 A1 | 11/2010 | Blinn et al. |
| 2010/0306669 A1 | 12/2010 | Della Pasqua |
| 2011/0004071 A1 | 1/2011 | Faiola et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0085059 A1 | 4/2011 | Noh |
| 2011/0102630 A1 | 5/2011 | Rukes |
| 2011/0131633 A1 | 6/2011 | Macaskill et al. |
| 2011/0141025 A1 | 6/2011 | Tsai |
| 2011/0145564 A1 | 6/2011 | Moshir et al. |
| 2011/0184980 A1 | 7/2011 | Jeong et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0255736 A1 | 10/2011 | Thompson et al. |
| 2011/0273575 A1 | 11/2011 | Lee |
| 2011/0276637 A1 | 11/2011 | Thornton et al. |
| 2011/0283188 A1 | 11/2011 | Farrenkopf |
| 2011/0286586 A1 | 11/2011 | Saylor et al. |
| 2011/0306387 A1 | 12/2011 | Moon |
| 2011/0320373 A1 | 12/2011 | Lee et al. |
| 2012/0150978 A1 | 1/2012 | Monaco |
| 2012/0028659 A1 | 2/2012 | Whitney et al. |
| 2012/0036443 A1 | 2/2012 | Ohmori et al. |
| 2012/0054797 A1 | 3/2012 | Skog et al. |
| 2012/0062805 A1 | 3/2012 | Candelore |
| 2012/0084731 A1 | 4/2012 | Filman et al. |
| 2012/0084835 A1 | 4/2012 | Thomas et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0117456 A1* | 5/2012 | Koskimies .......... G06F 9/44505 715/224 |
| 2012/0127196 A1 | 5/2012 | Landry |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0163664 A1 | 6/2012 | Zhu |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0200743 A1 | 8/2012 | Blanchflower et al. |
| 2012/0201362 A1* | 8/2012 | Crossan .................. G10L 15/26 379/88.01 |
| 2012/0208564 A1 | 8/2012 | Clark et al. |
| 2012/0209892 A1 | 8/2012 | Macaskill et al. |
| 2012/0209924 A1 | 8/2012 | Evans et al. |

(56) References Cited

U.S. PATENT DOCUMENTS

| | | |
|---|---|---|
| 2012/0210244 A1 | 8/2012 | De Francisco et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0254324 A1 | 10/2012 | Majeti et al. |
| 2012/0254325 A1 | 10/2012 | Majeti et al. |
| 2012/0259815 A1 | 10/2012 | Olson |
| 2012/0278387 A1 | 11/2012 | Garcia et al. |
| 2012/0278692 A1 | 11/2012 | Shi |
| 2012/0281129 A1 | 11/2012 | Wang et al. |
| 2012/0288147 A1 | 11/2012 | Fujitani |
| 2012/0290637 A1 | 11/2012 | Perantatos et al. |
| 2012/0299954 A1 | 11/2012 | Wada et al. |
| 2012/0304080 A1 | 11/2012 | Wormald et al. |
| 2012/0307096 A1 | 12/2012 | Bray et al. |
| 2012/0311623 A1* | 12/2012 | Davis ............... H04N 5/765 725/18 |
| 2012/0323933 A1 | 12/2012 | He et al. |
| 2012/0324018 A1 | 12/2012 | Metcalf et al. |
| 2013/0024757 A1 | 1/2013 | Doll et al. |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0085790 A1 | 4/2013 | Palmer et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0111514 A1 | 5/2013 | Slavin et al. |
| 2013/0128059 A1 | 5/2013 | Kristensson |
| 2013/0132477 A1 | 5/2013 | Bosworth et al. |
| 2013/0145286 A1 | 6/2013 | Feng et al. |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0194301 A1 | 8/2013 | Robbins et al. |
| 2013/0198176 A1 | 8/2013 | Kim |
| 2013/0222323 A1 | 8/2013 | McKenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290337 A1* | 10/2013 | Lansford ............... G06Q 50/01 707/738 |
| 2013/0290443 A1 | 10/2013 | Collins et al. |
| 2013/0304646 A1 | 11/2013 | De Geer |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0011538 A1 | 1/2014 | Mulcahy et al. |
| 2014/0019264 A1 | 1/2014 | Wachman et al. |
| 2014/0029034 A1 | 1/2014 | Toriyama |
| 2014/0032682 A1 | 1/2014 | Prado et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0059479 A1 | 2/2014 | Hamburg et al. |
| 2014/0082651 A1 | 3/2014 | Sharifi |
| 2014/0089264 A1 | 3/2014 | Talagala et al. |
| 2014/0089314 A1 | 3/2014 | Iizuka et al. |
| 2014/0122658 A1 | 5/2014 | Haeger et al. |
| 2014/0122787 A1 | 5/2014 | Shalvi et al. |
| 2014/0129627 A1 | 5/2014 | Baldwin et al. |
| 2014/0129953 A1 | 5/2014 | Spiegel |
| 2014/0136985 A1* | 5/2014 | Albir ............... H04W 4/21 715/748 |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173457 A1 | 6/2014 | Wang et al. |
| 2014/0189592 A1 | 7/2014 | Benchenaa et al. |
| 2014/0201527 A1 | 7/2014 | Krivorot |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0279061 A1 | 9/2014 | Elimeliah et al. |
| 2014/0279128 A1 | 9/2014 | Sagebin |
| 2014/0279436 A1 | 9/2014 | Dorsey et al. |
| 2014/0280537 A1 | 9/2014 | Pridmore et al. |
| 2014/0282096 A1 | 9/2014 | Rubinstein et al. |
| 2014/0289833 A1 | 9/2014 | Briceno |
| 2014/0298210 A1 | 10/2014 | Park et al. |
| 2014/0304622 A1* | 10/2014 | Jorasch ............... H04L 12/1813 715/753 |
| 2014/0317302 A1 | 10/2014 | Naik |
| 2014/0325383 A1 | 10/2014 | Brown et al. |
| 2014/0331188 A1 | 11/2014 | Sandstrom et al. |
| 2014/0359024 A1 | 12/2014 | Spiegel |
| 2014/0372844 A1 | 12/2014 | Zumkhawala |
| 2014/0379683 A1 | 12/2014 | Bazaz |
| 2015/0020086 A1 | 1/2015 | Chen et al. |
| 2015/0040011 A1 | 2/2015 | Chun |
| 2015/0046278 A1 | 2/2015 | Pei et al. |
| 2015/0055197 A1* | 2/2015 | Romanoff ............... H04N 1/00225 358/494 |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0094106 A1 | 4/2015 | Grossman et al. |
| 2015/0116529 A1 | 4/2015 | Wu et al. |
| 2015/0127754 A1* | 5/2015 | Clark ............... H04L 51/10 709/206 |
| 2015/0130178 A1 | 5/2015 | Clements |
| 2015/0142753 A1 | 5/2015 | Soon-Shiong |
| 2015/0172534 A1 | 6/2015 | Miyakawaa et al. |
| 2015/0177937 A1* | 6/2015 | Poletto ............... G06F 3/0484 715/739 |
| 2015/0178260 A1 | 6/2015 | Brunson |
| 2015/0248683 A1 | 9/2015 | Walkingshaw |
| 2015/0312184 A1 | 10/2015 | Langholz et al. |
| 2015/0326510 A1 | 11/2015 | Tomlinson et al. |
| 2015/0350136 A1 | 12/2015 | Flynn, III et al. |
| 2015/0365795 A1 | 12/2015 | Allen et al. |
| 2015/0367233 A1* | 12/2015 | Hicks ............... A63F 13/87 463/31 |
| 2015/0378502 A1 | 12/2015 | Hu et al. |
| 2016/0006927 A1 | 1/2016 | Sehn |
| 2016/0034253 A1* | 2/2016 | Bang ............... G06F 3/04883 715/728 |
| 2016/0048369 A1* | 2/2016 | Zenoff ............... G06F 3/1454 715/734 |
| 2016/0085994 A1* | 3/2016 | Pereira ............... G06F 21/6272 726/26 |
| 2016/0092962 A1 | 3/2016 | Wasserman et al. |
| 2016/0099901 A1 | 4/2016 | Allen et al. |
| 2016/0105387 A1 | 4/2016 | Jackson |
| 2016/0180887 A1* | 6/2016 | Sehn ............... G11B 27/036 386/285 |
| 2016/0182422 A1* | 6/2016 | Sehn ............... G06F 17/241 709/206 |
| 2016/0182875 A1* | 6/2016 | Sehn ............... H04N 9/806 348/515 |
| 2016/0253833 A1* | 9/2016 | Lew ............... G06T 11/60 715/202 |
| 2016/0253912 A1 | 9/2016 | Heilman et al. |
| 2016/0277419 A1 | 9/2016 | Allen et al. |

(56) References Cited

U.S. PATENT DOCUMENTS

| | | |
|---|---|---|
| 2016/0321708 A1 | 11/2016 | Sehn |
| 2016/0352659 A1 | 12/2016 | Krishnamoorth |
| 2017/0111617 A1 | 4/2017 | Kuwahara et al. |
| 2017/0149717 A1 | 5/2017 | Sehn |
| 2017/0310888 A1* | 10/2017 | Wright .................. H04N 5/772 |
| 2017/0374003 A1 | 12/2017 | Allen et al. |
| 2018/0103002 A1 | 4/2018 | Sehn |
| 2018/0316575 A1* | 11/2018 | Son ........................ H04L 41/22 |
| 2019/0237106 A1 | 8/2019 | Sehn |

FOREIGN PATENT DOCUMENTS

| | | |
|---|---|---|
| CN | 101635763 A | 1/2010 |
| CN | 102238107 A | 11/2011 |
| CN | 103095768 A | 5/2013 |
| CN | 107251006 A | 10/2017 |
| KR | 1020060038872 A | 5/2006 |
| KR | 1020080006729 A | 1/2008 |
| KR | 1020080017854 A | 2/2008 |
| KR | 1020120140404 A | 12/2012 |
| KR | 1020140115413 A | 10/2014 |
| KR | 101869473 | 6/2018 |
| KR | 101983523 B1 | 5/2019 |
| KR | 102021727 B1 | 9/2019 |
| WO | WO-2011040821 A1 | 4/2011 |
| WO | 2013006584 | 1/2013 |
| WO | WO-2014031562 A1 | 2/2014 |
| WO | WO-2014093668 A1 | 6/2014 |
| WO | WO-2014194262 A2 | 12/2014 |
| WO | WO-2015192026 A1 | 12/2015 |
| WO | WO-2016007285 A1 | 1/2016 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016149594 A1 | 9/2016 |

OTHER PUBLICATIONS

US 10,425,370 B2, 09/2019, Allen et al. (withdrawn)
"U.S. Appl. No. 14/967,472, filed Mar. 16, 2018 Non Final Office Action dated Jan. 12, 2018", 13 pgs.
"U.S. Appl. No. 15/224,359, Final Office Action dated Apr. 2, 2018", 18 pgs.
"U.S. Appl. No. 15/224,365, Final Office Action dated Apr. 2, 2018", 19 pgs.
"U.S. Appl. No. 15/224,372, Final Office Action dated Apr. 3, 2018", 18 pgs.
"U.S. Appl. No. 15/787,467, Non Final Office Action dated Apr. 18, 2018", 17 pgs.
"U.S. Appl. No. 15/224,343, Final Office Action dated Apr. 19, 2018", 20 pgs.
"U.S. Appl. No. 15/224,312, Final Office Action dated Apr. 20, 2018", 22 pgs.
"U.S. Appl. No. 15/224,355, Final Office Action dated Apr. 24, 2018", 20 pgs.
"U.S. Appl. No. 14/612,692, Examiner Interview Summary dated May 14, 2018", 3 pgs.
"U.S. Appl. No. 15/152,975, Examiner Interview Summary dated May 14, 2018", 3 pgs.
"U.S. Appl. No. 15/152,975, filed May 10, 2018 to Non Final Office Action dated Jan. 10, 2018", 13 pgs.
"U.S. Appl. No. 14/612,692, filed May 9, 2018 to Non Final Office Action dated Jan. 9, 2018", 15 pgs.
"U.S. Appl. No. 15/298,806, Non Final Office Action dated May 17, 2018", 16 pgs.
"U.S. Appl. No. 14/634,417, Notice of Allowance dated May 22, 2018", 9 pgs.
"U.S. Appl. No. 15/729,582, Non Final Office Action dated May 25, 2018", 14 pgs.

"U.S. Appl. No. 16/000,657, Preliminary Amendment filed Jun. 6, 2018", 8 pgs.
"Canadian Application Serial No. 2,910,158, Office Action dated Jun. 6, 2018", 5 pgs.
"U.S. Appl. No. 15/224,383, filed Jun. 14, 2018 to Final Office Action dated Feb. 14, 2018", 14 pgs.
"U.S. Appl. No. 15/224,377, Non Final Office Action dated Jun. 15, 2018", 19 pgs.
"Canadian Application Serial No. 2,894,332, Request for Reinstatement filed Jun. 11, 2018", w Amended Claims, 17 pgs.
"U.S. Appl. No. 14/967,472, Final Office Action dated Jun. 25, 2018", 14 pgs.
"U.S. Appl. No. 15/152,975, Final Office Action dated Jul. 2, 2018", 19 pgs.
"U.S. Appl. No. 15/074,029, Final Office Action dated Jun. 28, 2018", 22 pgs.
"European Application Serial No. 15870861.0, Extended European Search Report dated Jul. 3, 2018", 4 pgs.
"U.S. Appl. No. 15/224,383, Non Final Office Action dated Jul. 5, 2018", 19 pgs.
"U.S. Appl. No. 14/612,692, Notice of Allowance dated Jul. 5, 2018", 11 pgs.
"European Application Serial No. 15870861.0, Communication Pursuant to Article 94(3) EPC dated Jul. 12, 2018", 5 pgs.
"U.S. Appl. No. 15/787,467, filed Jul. 18, 2018 to Non Final Office Action dated Apr. 18, 2018", 12 pgs.
"U.S. Appl. No. 15/224,343, filed Jul. 19, 2018 to Final Office Action dated Apr. 19, 2018", 16 pgs.
"U.S. Appl. No. 15/224,372, filed Aug. 3, 2018 to Final Office Action dated Apr. 3, 2018", 14 pgs.
"U.S. Appl. No. 15/298,806, filed Aug. 10, 2018 to Non Final Office Action dated May 17, 2018", 15 pgs.
"U.S. Appl. No. 15/298,806, Examiner Interview Summary dated Aug. 13, 2018", 3 pgs.
"U.S. Appl. No. 15/224,312, filed Aug. 20, 2018 to Final Office Action dated Apr. 20, 2018", 16 pgs.
"U.S. Appl. No. 15/224,383, Examiner Interview Summary dated Aug. 15, 2018", 4 pgs.
"U.S. Appl. No. 15/074,029, filed Aug. 28, 2018 to Final Office Action dated Jun. 28, 2018", 21 pgs.
"U.S. Appl. No. 15/224,359, filed Sep. 4, 2018 to Final Office Action dated Apr. 2, 2018", 14 pgs.
"U.S. Appl. No. 15/224,343, Non Final Office Action dated Sep. 4, 2018", 20 pgs.
"U.S. Appl. No. 15/224,372, Non Final Office Action dated Sep. 14, 2018", 20 pgs.
"U.S. Appl. No. 15/787,467, Notice of Allowance dated Aug. 31, 2018", 8 pgs.
"U.S. Appl. No. 15/298,806, Notice of Allowance dated Sep. 19, 2018", 5 pgs.
"U.S. Appl. No. 15/152,975, filed Sep. 19, 2018 to Final Office Action dated Jul. 2, 2018", 14 pgs.
"U.S. Appl. No. 15/787,467, Corrected Notice of Allowability dated Sep. 24, 2018", 2 pgs.
"U.S. Appl. No. 15/224,355, filed Sep. 24, 2018 to Final Office Action dated Apr. 24, 2018", 19 pgs.
"U.S. Appl. No. 14/967,472, filed Sep. 21, 2018 to Final Office Action dated Jun. 25, 2018", 11 pgs.
Chen, Datong, "Protecting Personal Identification in Video", Protecting Privacy in Video Surveillance, Springer-Verlag London Ltd., (2009), 115-128.
"U.S. Appl. No. 15/224,359, Non Final Office Action dated Sep. 28, 2018", 15 pgs.
"U.S. Appl. No. 14/304,855, corrected Notice of Allowance dated Jun. 26, 2015", 8 pgs.
"U.S. Appl. No. 14/304,855, Final Office Action dated Feb. 18, 2015", 10 pgs.
"U.S. Appl. No. 14/304,855, Non Final Office Action dated Mar. 18, 2015", 9 pgs.
"U.S. Appl. No. 14/304,855, Non Final Office Action dated Oct. 22, 2014", 11 pgs.
"U.S. Appl. No. 14/304,855, Notice of Allowance dated Jun. 1, 2015", 11 pgs.

(56) References Cited

OTHER PUBLICATIONS

"U.S. Appl. No. 14/304,855, filed Feb. 25, 2015 to Final Office Action dated Feb. 18, 2015", 5 pgs.
"U.S. Appl. No. 14/304,855, filed Apr. 1, 2015 to Non Final Office Action dated Mar. 18, 2015", 4 pgs.
"U.S. Appl. No. 14/304,855, filed Nov. 7, 2014 to Non Final Office Action dated Oct. 22, 2014", 5 pgs.
"U.S. Appl. No. 14/505,478, Advisory Action dated Apr. 14, 2015", 3 pgs.
"U.S. Appl. No. 14/505,478, Corrected Notice of Allowance dated May 18, 2016", 2 pgs.
"U.S. Appl. No. 14/505,478, Final Office Action dated May 17, 2015", 16 pgs.
"U.S. Appl. No. 14/505,478, Non Final Office Action dated Jan. 27, 2015", 13 pgs.
"U.S. Appl. No. 14/505,478, Non Final Office Action dated Sep. 4, 2015", 19 pgs.
"U.S. Appl. No. 14/505,478, Notice of Allowance dated Apr. 28, 2016", 11 pgs.
"U.S. Appl. No. 14/505,478, filed Jan. 30, 2015 to Non Final Office Action dated Jan. 27, 2015", 10 pgs.
"U.S. Appl. No. 14/505,478, filed Mar. 4, 2016 to Non Final Office Action dated Sep. 4, 2015", 12 pgs.
"U.S. Appl. No. 14/505,478, filed Apr. 1, 2015 to Final Office Action dated Mar. 17, 2015", 6 pgs.
"U.S. Appl. No. 14/506,478, filed Aug. 17, 2015 to Advisory Action dated Apr. 14, 2015", 10 pgs.
"U.S. Appl. No. 14/523,728, Non Final Office Action dated Dec. 12, 2014", 10 pgs.
"U.S. Appl. No. 14/523,728, Notice of Allowance dated Mar. 24, 2015", 8 pgs.
"U.S. Appl. No. 14/523,728, Notice of Allowance dated Apr. 15, 2015", 8 pgs.
"U.S. Appl. No. 14/523,728, Notice of Allowance dated Jun. 5, 2015", 8 pgs.
"U.S. Appl. No. 14/523,728, filed Aug. 25, 2014 to Non Final Office Action dated Jan. 16, 2015", 5 pgs.
"U.S. Appl. No. 14/529,064, Final Office Action dated Aug. 11, 2015", 23 pgs.
"U.S. Appl. No. 14/529,064, Non Final Office Action dated Mar. 12, 2015", 20 pgs.
"U.S. Appl. No. 14/529,064, filed Feb. 5, 2015 to Restriction Requirement dated Feb. 2, 2015", 6 pgs.
"U.S. Appl. No. 14/529,064, filed Mar. 26, 2015 to Non Final Office Action dated Mar. 12, 2015", 8 pgs.
"U.S. Appl. No. 14/529,064, Restriction Requirement dated Feb. 2, 2015", 5 pgs.
"U.S. Appl. No. 14/529,064, filed Oct. 12, 2015 to Final Office Action dated Aug. 11, 2015", 19 pgs.
"U.S. Appl. No. 14/578,258, Examiner Interview Summary dated Nov. 25, 2015", 3 pgs.
"U.S. Appl. No. 14/578,258, Non Final Office Action dated Jun. 10, 2015", 12 pgs.
"U.S. Appl. No. 14/578,258, Notice of Allowance dated Feb. 26, 2016", 5 pgs.
"U.S. Appl. No. 14/578,258, filed Dec. 10, 2015 to Non Final Office Action dated Jun. 10, 2015", 11 pgs.
"U.S. Appl. No. 14/578,271, Final Office Action dated Dec. 3, 2015". 15 pgs.
"U.S. Appl. No. 14/578,271, Non Final Office Action dated Aug. 7, 2015", 12 pgs.
"U.S. Appl. No. 14/578,271, filed Feb. 9, 2016 to Final Office Action dated Dec. 3, 2015", 10 pgs.
"U.S. Appl. No. 14/578,271, filed Jun. 19, 2015 to Restriction Requirement dated Apr. 23, 2015", 6 pgs.
"U.S. Appl. No. 14/578,271, filed Oct. 28, 2015 to Non Final Office Action dated Aug. 7, 2015", 9 pgs.
"U.S. Appl. No. 14/578,271, Restriction Requirement dated Apr. 23, 2015", 8 pgs.

"U.S. Appl. No. 14/612,692, Examiner Interview Summary dated Jan. 29, 2016", 5 pgs.
"U.S. Appl. No. 14/612,692, Examiner Interview Summary dated Aug. 14, 2015", 3 pgs.
"U.S. Appl. No. 14/612,692, Final Office Action dated Nov. 23, 2015", 15 pgs.
"U.S. Appl. No. 14/612,692, Non Final Office Action dated Mar. 28, 2016", 15 pgs.
"U.S. Appl. No. 14/612,692, Non Final Office Action dated Jul. 20, 2015", 25 pgs.
"U.S. Appl. No. 14/612,692, filed Feb. 23, 2016 to Final Office Action dated Nov. 23, 2015", 10 pgs.
"U.S. Appl. No. 14/612,692, filed Jun. 28, 2016 to Non Final Office Action dated Mar. 28, 2016", 14 pgs.
"U.S. Appl. No. 14/612,692, filed Oct. 19, 2015 to Non Final Office Action dated Jul. 20, 2015", 11 pgs.
"U.S. Appl. No. 14/704,212, Non Final Office Action dated Dec. 4, 2015", 17 pgs.
"U.S. Appl. No. 14/738,069, Non Final Office Action dated Mar. 21, 2016", 12 pgs.
"U.S. Appl. No. 14/738,069, filed Jun. 10, 2016 to Non Final Office Action dated Mar. 21, 2016", 10 pgs.
"U.S. Appl. No. 14/808,283, Notice of Allowance dated Apr. 12, 2016", 9 pgs.
"U.S. Appl. No. 14/808,283, Preliminary Amendment filed Jul. 24, 2015", 8 pgs.
"U.S. Appl. No. 14/967,472, Preliminary Amendment filed Dec. 15, 2015", 6 pgs.
"U.S. Appl. No. 15/152,975, Preliminary Amendment filed May 19, 2016", 8 pgs.
"International Application Serial No. PCT/US2015/035591, International Search Report dated Aug. 11, 2015", 5 pgs.
"International Application Serial No. PCT/US2015/035591, International Written Opinion dated Aug. 11, 2015", 5 pgs.
"International Application Serial No. PCT/US2015/053811, International Search Report dated Nov. 23, 2015", 5 pgs.
"International Application Serial No. PCT/US2015/053811, Written Opinion dated Nov. 23, 2015", 8 pgs.
"International Application Serial No. PCT/US2015/056884, International Search Report dated Dec. 22, 2015", 5 pgs.
"International Application Serial No. PCT/US2015/056884, Written Opinion dated Dec. 22, 2015", 6 pgs.
"International Application Serial No. PCT/US2015/065821, International Search Report dated Mar. 3, 2016", 2 pgs.
"International Application Serial No. PCT/US2015/065821, Written Opinion dated Mar. 3, 2016", 3 pgs.
"iVisit Mobile Getting Started", iVisit, (Dec. 4, 2013), 1-16.
"PearlEyes by Red Giant", © 2002-2015 Red Giant LLC, [Online]. Retrieved from the Internet: <URL: http://www.redgiant.com/products/pluraleyes/, (Accessed Nov. 11, 2015), 5 pgs.
Castelluccia, Claude, et al., "EphPub: Toward robust Ephemeral Publishing", Network Protocols (ICNP), 2011 19th IEEE International Conference on, IEEE, (Oct. 17, 2011), 18 pgs.
Clarke, Tangier, "Automatically syncing multiple clips and lots of audio like PluralEyes possible?", [Online]. Retrieved from the Internet: <URL: https://forums.creativecow.net/thread/344/20553, (May 21, 2013), 8 pgs.
Melanson, Mike, "This text message will self destruct in 60 seconds", readwrite.com, [Online]. Retrieved from the Internet: <http://readwrite.com/2011/02/11/this_text_message_will_self_destruct_in_60_seconds>, Feb. 18, 2015).
Sawers, Paul, "Snapchat for ios lets you send photos to friends and set how long they're visible for", http://thenextweb.com/apps/2012/05/07/ snapchat-for-ios-lets-you-send-photos-to-f riends-and-set-how-long-theyre-visible-for, (May 2012), 1-3 pgs.
Sawers, Paul, "Snapchatfor iOS Lets You Send Photos to Friends and Set How long They're Visible for", [Online]. Retrieved from the Internet: <http:/ /thenextweb.com/apps/2012/05/07/Snapchat-for-ios-lets-you-send-photos-to-friends-and-set-how-long-theyre-visiblefor/#! xCjrp>,, (May 7, 2012), 1-5.
Trice, Andrew, "My Favorite New Feature: Multi-Clip Sync in Premiere Pro CC", [Online]. Retrieved from the Internet: <URL:

(56) References Cited

OTHER PUBLICATIONS http://www.tricedesigns.com/2013/06/18/my-favorite-new-feature-multi-cam-synch-in-premiere-pro-cc/, (Jun. 18, 2013), 5 pgs.
U.S. Appl. No. 14/723,400, U.S. Pat. No. 9,396,354, filed May 27, 2015, Apparatus and Method for Automated Privacy Protection in Distributed Images.
U.S. Appl. No. 15/212,095, U.S. Pat. No. 9,785,796, filed Jul. 15, 2016, Apparatus and Method for Automated Privacy Protection in Distributed Images.
U.S. Appl. No. 15/729,582, filed Oct. 10, 2017, Apparatus and Method for Automated Privacy Protection in Distributed Images.
U.S. Appl. No. 14/612,692, filed Feb. 3, 2015, Multichannel System.
U.S. Appl. No. 15/152,975, filed May 12, 2016, Multichannel System.
U.S. Appl. No. 15/074,029, filed Mar. 18, 2016, Geo-Fence Authorization Provisioning.
U.S. Appl. No. 14/505,478, filed Oct. 2, 2014, Ephemeral Gallery of Ephemeral Messages.
U.S. Appl. No. 14/578,271, filed Dec. 19, 2014, Gallery of Videos Set to an Audio Time Line.
U.S. Appl. No. 14/967,472, filed Dec. 14, 2015, Gallery of Videos Set to an Audio Time Line.
U.S. Appl. No. 14/634,417, filed Feb. 27, 2015, Ephemeral Gallery of Ephemeral Messages with Opt-In Permanence.
U.S. Appl. No. 14/304,855, U.S. Pat. No. 9,113,301, filed Jun. 13, 2014, Geo-Location Based Event Gallery.
U.S. Appl. No. 14/578,258, U.S. Pat. No. 9,385,983, filed Dec. 19, 2014, Gallery of Messages From Individuals With a Shared Interest.
U.S. Appl. No. 14/523,728, U.S. Pat. No. 9,094,137, filed Oct. 24, 2014, Priority Based Placement of Messages in a Geo-Location Based Event Gallery.
U.S. Appl. No. 14/738,069, filed Jun. 12, 2015, Geo-Location Based Event Gallery.
U.S. Appl. No. 14/808,283, filed Jul. 24, 2015, Prioritization of Messages Within Gallery.
"U.S. Appl. No. 14/578,271, Corrected Notice of Allowance dated Oct. 30, 2017", 2 pgs.
"U.S. Appl. No. 14/578,271, Notice of Allowability dated Nov. 29, 2017", 3 pgs.
"U.S. Appl. No. 14/612,692, Examiner Interview Summary dated Nov. 13, 2017", 13 pgs.
"U.S. App. No. 14/612,692, filed Nov. 22, 2017 to Final Office Action dated Aug. 25, 2017", 11 pgs.
"U.S. Appl. No. 14/634,417, Examiner Interview Summary dated Aug. 7, 2017", 3 pgs.
"U.S. Appl. No. 14/634,417, Notice of Allowance dated Oct. 25, 2017", 9 pgs.
"U.S. Appl. No. 14/634,417, filed Sep. 21, 2017 to Non Final Office Action dated Jun. 8, 2017", 16 pgs.
"U.S. Appl. No. 15/074,029, Non Final Office Action dated Nov. 30, 2017", 16 pgs.
"U.S. Appl. No. 15/152,975, Examiner Interview Summary dated Nov. 13, 2017", 13 pgs.
"U.S. Appl. No. 15/152,975, filed Nov. 30, 2017 to Final Office Action dated Jun. 30, 2017", 9 pgs.
"U.S. Appl. No. 15/224,312, Non Final Office Action dated Oct. 11, 2017", 29 pgs.
"U.S. Appl. No. 15/224,343, Non Final Office Action dated Oct. 4, 2017", 26 pgs.
"U.S. Appl. No. 15/224,355, Examiner Interview Summary dated Oct. 25, 2017", 3 pgs.
"U.S. Appl. No. 15/224,355, Non Final Office Action dated Sep. 6, 2017", 30 pgs.
"U.S. Appl. No. 15/224,383, Examiner Interview Summary dated Oct. 25, 2017", 3 pgs.
"U.S. Appl. No. 15/224,383, Non Final Office Action dated Aug. 30, 2017", 26 pgs.
"U.S. Appl. No. 15/298,806, Final Office Action dated Oct. 24, 2017", 15 pgs.
"U.S. Appl. No. 15/298,806, filed Sep. 12, 2017 to Non Final Office Action dated Jun. 12, 2017", 12 pgs.
"U.S. Appl. No. 15/702,511, Preliminary Amendment filed Sep. 15, 2017", 13 pgs.
"U.S. Appl. No. 15/787,467, Preliminary Amendment filed Oct. 26, 2017", 11 pgs.
"Canadian Application Serial No. 2,894,332, Response filed Jan. 24, 2017 to Office Action dated Aug. 16, 2016", 15 pgs.
"European Application Serial No. 15870874.3, Extended European Search Report dated Nov. 29, 2017", 7 pgs.
"International Application Serial No. PCT/US2016/023085, International Preliminary Report Patentability dated Sep. 28, 2017", 8 pgs.
"Korean Application Serial No. 10-2017-7020217, Office Action dated Sep. 15, 2017", With English Translation, 11 pgs.
"Korean Application Serial No. 10-2017-7020217, Response filed Nov. 2, 2017 to Office Action dated Sep. 15, 2017", with English Translation, 17 pgs.
"U.S. Appl. No. 14/505,478, Corrected Notice of Allowance dated Jul. 22, 2016", 2 pgs.
"U.S. Appl. No. 14/505,478, Notice of Allowance dated Aug. 26, 2016", 11 pgs.
"U.S. Appl. No. 14/578,271, Notice of Allowance dated Aug. 1, 2017", 5 pgs.
"U.S. Appl. No. 14/578,271, Notice of Allowance dated Dec. 7, 2016", 7 pgs.
"U.S. Appl. No. 14/612,692, Examiner Interview Summary dated Jul. 6, 2016", 4 pgs.
"U.S. Appl. No. 14/612,692, Examiner Interview Summary dated Sep. 8, 2016", 3 pgs.
"U.S. Appl. No. 14/612,692, Final Office Action dated Aug. 15, 2016", 18 pgs.
"U.S. Appl. No. 14/612,692, Final Office Action dated Aug. 25, 2017", 18 pgs.
"U.S. Appl. No. 14/612,692, Non Final Office Action dated Jan. 3, 2017", 17 pgs.
"U.S. Appl. No. 14/612,692, filed May 3, 2017 to Non Final Office Action dated Jan. 3. 2017", 18 pgs.
"U.S. Appl. No. 14/612,692, filed Nov. 14, 2016 to Final Office Action dated Aug. 15, 2016", 15 pgs.
"U.S. Appl. No. 14/634,417, Advisory Action dated Mar. 14, 2017", 3 pgs.
"U.S. Appl. No. 14/634,417, Final Office Action dated Jan. 31, 2017", 27 pgs.
"U.S. Appl. No. 14/634,417, Non Final Office Action dated Jun. 8, 2017", 17 pgs.
"U.S. Appl. No. 14/634,417, Non Final Office Action dated Aug. 30, 2016", 23 pgs.
"U.S. Appl. No. 14/634,417, filed Mar. 2, 2017 to Final Office Action dated Jan. 31, 2017", 23 pgs.
"U.S. Appl. No. 14/634,417, filed Nov. 30, 2016 to Non Final Office Action dated Aug. 30, 2016", 18 pgs.
"U.S. Appl. No. 14/738,069, Notice of Allowance dated Aug. 17, 2016", 6 pgs.
"U.S. Appl. No. 14/808,283, Notice of Allowance dated Jul. 14, 2016", 8 pgs.
"U.S. Appl. No. 14/967,472, Final Office Action dated Mar. 10, 2017", 15 pgs.
"U.S. Appl. No. 14/967,472, Non Final Office Action dated Sep. 8, 2016", 11 pgs.
"U.S. Appl. No. 14/967,472, filed Jun. 7, 2017 to Final Office Action dated Mar. 10, 2017", 12 pgs.
"U.S. Appl. No. 14/967,472, filed Dec. 5, 2016 to Non Final Office Action dated Sep. 8, 2016", 11 pgs.
"U.S. Appl. No. 15/152,975, Final Office Action dated Jun. 30, 2017", 17 pgs.
"U.S. Appl. No. 15/152,975, Non Final Office Action dated Jan. 12, 2017", 36 pgs.
"U.S. Appl. No. 15/152,975, filed Jun. 12, 2017 to Non Final Office Action dated Jan. 12, 2017", 13 pgs.
"U.S. Appl. No. 15/208,460, Notice of Allowance dated Feb. 27, 2017", 8 pgs.

(56) References Cited

OTHER PUBLICATIONS

"U.S. Appl. No. 15/208,460, Notice of Allowance dated Dec. 30, 2016", 9 pgs.
"U.S. Appl. No. 15/208,460, Supplemental Preliminary Amendment filed Jul. 18, 2016", 8 pgs.
"U.S. Appl. No. 15/224,312, Preliminary Amendment filed Feb. 1, 2017", 11 pgs.
"U.S. Appl. No. 15/224,343, Preliminary Amendment filed Jan. 31, 2017", 10 pgs.
"U.S. Appl. No. 15/224,355, Preliminary Amendment filed Apr. 3, 2017", 12 pgs.
"U.S. Appl. No. 15/224,359, Non Final Office Action dated Jul. 20, 2017", 33 pgs.
"U.S. Appl. No. 15/224,365, Non Final Office Action dated Aug. 8, 2017", 41 pgs.
"U.S. Appl. No. 15/224,372, Non Final Office Action dated Aug. 7, 2017", 40 pgs.
"U.S. Appl. No. 15/224,372, Preliminary Amendment filed May 5, 2017", 10 pgs.
"U.S. Appl. No. 15/224,377, Non Final Office Action dated Aug. 4, 2017", 41 pgs.
"U.S. Appl. No. 15/224,359, Preliminary Amendment filed Apr. 19, 2017", 8 pgs.
"U.S. Appl. No. 15/298,806, Non Final Office Action dated Jun. 12, 2017", 26 pgs.
"U.S. Appl. No. 15/298,806, Preliminary Amendment filed Oct. 21, 2016", 8 pgs.
"U.S. Appl. No. 15/416,846, Notice of Allowance dated Jul. 19, 2017", 9 pgs.
"U.S. Appl. No. 15/416,846, Preliminary Amendment filed Feb. 18, 2017", 10 pgs.
"Canadian Application Serial No. 2,894,332, Office Action dated Aug. 16, 2016", 4 pgs.
"Canadian Application Serial No. 2,910,158, Office Action dated Dec. 15, 2016", 5 pgs.
"Canadian Application Serial No. 2,910,158, Response filed Apr. 11, 2017 to Office Action dated Dec. 15, 2016", 21 pgs.
"European Application Serial No. 15870861.0, Response filed Aug. 9, 2017 to Communication Pursuant to Rules 161(2) and 162 EPC dated Aug. 4, 2017", 10 pgs.
"How Snaps Are Stored and Deleted", Snapchat, [Online]. Retrieved from the Internet: <URL: https://web.archive.org/web/20130607042322/http://blog.snapchat.com/post/50060403002/how-snaps-are-stored-and-deleted, (May 9, 2013), 2 pgs.
"International Application Serial No. PCT/US2015/035591, International Preliminary Report on Patentability dated Dec. 22, 2016", 7 pgs.
"International Application Serial No. PCT/US2015/053811, International Preliminary Report on Patentability dated Apr. 13, 2017", 9 pgs.
"International Application Serial No. PCT/US2015/056884, International Preliminary Report on Patentability dated May 4, 2017", 8 pgs.
"International Application Serial No. PCT/US2015/065785, International Preliminary Report on Patentability dated Jun. 29, 2017", 7 pgs.
"International Application Serial No. PCT/US2015/065785, International Search Report dated Jul. 21, 2016", 5 pgs.
"International Application Serial No. PCT/US2015/065785, Written Opinion dated Jul. 21, 2016", 5 pgs.
"International Application Serial No. PCT/US2015/065821, International Preliminary Report on Patentability dated Jun. 29, 2017", 5 pgs.
Leyden, John, "This SMS will self-destruct in 40 seconds", [Online]. Retrieved from the Internet: <URL: http://www.theregister.co.uk/2005/12/12/stealthtext/, (Dec. 12, 2005), 1 pg.
Shein, Esther, "Ephemeral Data", Communications of the ACM vol. 56 | No. 9, (Sep. 2013), 20-22.
U.S. Appl. No. 15/702,511, filed Sep. 12, 2017, Ephemeral Gallery of Ephemeral Messages.
U.S. Appl. No. 15/787,467, filed Oct. 18, 2017, Prioritization of Messages Within a Message Collection.
"Android Getting Started Guide", Voxer Business, [Online]. Retrieved from the Internet:<https://voxer.com/assets/AndroidGuide.pdf>, (Feb. 1, 2014), 18 pgs.
"U.S. Appl. No. 14/612,692, Non Final Office Action dated Jan. 9, 2018", 19 pgs.
"U.S. Appl. No. 14/723,400, Final Office Action dated Jan. 4, 2016", 14 pgs.
"U.S. Appl. No. 14/723,400, Non Final Office Action dated Jul. 20, 2015", 14 pgs.
"U.S. Appl. No. 14/723,400, Notice of Allowance dated Mar. 28, 2016", 12 pgs.
"U.S. Appl. No. 14/723,400, Notice of Non Compliant Amendment dated Sep. 21, 2015", 2 pgs.
"U.S. Appl. No. 14/723,400, Notice of Non Compliant Amendment dated Nov. 10, 2015", 2 pgs.
"U.S. Appl. No. 14/723,400, filed Jan. 29, 2016 to Final Office Action dated Jan. 4, 2016", 8 pgs.
"U.S. Appl. No. 14/723,400, filed Aug. 13, 2015 to Non Final Office Action dated Jul. 20, 2015", 7 pgs.
"U.S. Appl. No. 14/723,400, filed Sep. 23, 2015 to Notice of Non Compliant Amendment dated Sep. 21, 2015", 5 pgs.
"U.S. Appl. No. 14/723,400, filed Nov. 19, 2015 to Notice of Non Compliant Amendment dated Nov. 10, 15", 5 pgs.
"U.S. Appl. No. 14/967,472, Non Final Office Action dated Jan. 12, 2018", 17 pgs.
"U.S. Appl. No. 15/074,029, filed Feb. 28, 2018 to Non Final Office Action dated Nov. 30, 2017", 12 pgs.
"U.S. Appl. No. 15/152,975, Non Final Office Action dated Jan. 10, 2018", 18 pgs.
"U.S. Appl. No. 15/212,095, Final Office Action dated Mar. 14, 2017", 9 pgs.
"U.S. Appl. No. 15/212,095, Non Final Office Action dated Feb. 2, 2017", 8 pgs.
"U.S. Appl. No. 15/212,095, Notice of Allowance dated Jun. 1, 2017", 8 pgs.
"U.S. Appl. No. 15/212,095, Notice of Allowance dated Sep. 8, 2017", 2 pgs.
"U.S. Appl. No. 15/212,095, filed Feb. 28, 2017 to Non Final Office Action dated Feb. 2, 2017", 2 pgs.
"U.S. Appl. No. 15/212,095, filed May 15, 2017 to Final Office Action dated Mar. 14, 2017", 2 pgs.
"U.S. Appl. No. 15/224,343, filed Mar. 5, 2018 to Non Final Office Action dated Oct. 4, 2017", 23 pgs.
"U.S. Appl. No. 15/224,355, filed Mar. 6, 2018 to Non Final Office Action dated Sep. 6, 2017", 25 pgs.
"U.S. Appl. No. 15/224,359, filed Jan. 22, 2018 to Non Final Office Action dated Jul. 20, 2017", 13 pgs.
"U.S. Appl. No. 15/224,365, filed Feb. 8, 2018 to Non Final Office Action dated Aug. 8, 2017", 14 pgs.
"U.S. Appl. No. 15/224,372, filed Jan. 8, 2017 to Non Final Office Action dated Aug. 7, 2017", 22 pgs.
"U.S. Appl. No. 15/224,377, Final Office Action dated Jan. 2, 2018", 29 pgs.
"U.S. Appl. No. 15/224,377, filed Dec. 6, 2017 to Non Final Office Action dated Aug. 4, 2017", 22 pgs.
"U.S. Appl. No. 15/224,383, Final Office Action dated Feb. 14, 2018", 25 pgs.
"U.S. Appl. No. 15/224,383, Preliminary Amendment filed May 9, 2017", 13 pgs.
"U.S. Appl. No. 15/224,383, filed Jan. 3, 2018 to Non Final Office Action dated Aug. 30, 2017", 25 pgs.
"U.S. Appl. No. 15/298,806, Advisory Action dated Jan. 29, 2018", 4 pgs.
"U.S. Appl. No. 15/298,806, Examiner Interview Summary dated Jan. 12, 2018", 3 pgs.
"U.S. Appl. No. 15/298,806, filed Jan. 9, 2018 to Final Office Action dated Oct. 24, 2017", 17 pgs.
"European Application Serial No. 14804343.3, Extended European Search Report dated Sep. 29, 2016", 12 pgs.
"International Application Serial No. PCT/US2014/040346, International Search Report dated Mar. 23, 2015", 2 pgs.

(56) References Cited

OTHER PUBLICATIONS

"International Application Serial No. PCT/US2014/040346, Written Opinion dated Mar. 23, 2015", 6 pgs.

"International Application Serial No. PCT/US2015/037251, International Search Report dated Sep. 29, 2015", 2 pgs.

"International Application Serial No. PCT/US2015/037251, Written Opinion dated Sep. 29, 2015", 4 pgs.

"Korean Application Serial No. 10-2017-7020217, Final Office Action dated Jan. 31, 2018", w/ English Translation, 10 pgs.

"Korean Application Serial No. 10-2017-7020217, filed Feb. 23, 2018 to Final Office Action dated Jan. 31, 2018", w. English Translation, 13 pgs.

Fajman, "An Extensible Message Format for Message Disposition Notifications", Request for Comments: 2298, National Institutes of Health, (Mar. 1998), 28 pgs.

"International Application Serial No. PCT/US2016/023085, International Search Report dated Jun. 17, 2016", 5 pgs.

"International Application Serial No. PCT/US2016/023085, Written Opinion dated Jun. 17, 2016", 6 pgs.

U.S. Appl. No. 15/947,350, filed Apr. 6, 2018, Automated Chronological Display of Ephemeral Message Gallery (as amended).

U.S. Appl. No. 16/000,657, filed Jun. 5, 2018, Ephemeral Gallery of Ephemeral Messages With Opt-In Permanence.

U.S. Appl. No. 15/946,990, filed Apr. 6, 2018, Message Destination List Mechanism (as amended).

U.S. Appl. No. 16/219,577, filed Dec. 13, 2018, Geo-Location Based Event Gallery.

U.S. Appl. No. 16/204,886, filed Nov. 29, 2018, Prioritization of Messages Within a Message Collection "U.S. Appl. No. 14/967,472, Notice of Allowance dated Jan. 24, 2019", 6 pgs.

"U.S. Appl. No. 15/074,029, Advisory Action dated Oct. 11, 2018", 3 pgs.

"U.S. Appl. No. 15/074,029, Non Final Office Action dated Jan. 23, 2019", 19 pgs.

"U.S. Appl. No. 15/152,975, Non Final Office Action dated Sep. 28, 2018", 28 pgs.

"U.S. Appl. No. 15/224,312, Non Final Office Action dated Oct. 22, 2018", 15 pgs.

"U.S. Appl. No. 15/224,355, Non Final Office Action dated Dec. 20, 2018", 14 pgs.

"U.S. Appl. No. 15/224,365, Non Final Office Action dated Jan. 3, 2019", 11 pgs.

"U.S. Appl. No. 15/224,365, filed Oct. 2, 2018 to Final Office Action dated Apr. 2, 2018", 15 pgs.

"U.S. Appl. No. 15/224,372, filed Jan. 16, 2019 to Non Final Office Action dated Sep. 14, 2018", 18 pgs.

"U.S. Appl. No. 15/224,377, filed Dec. 17, 2018 to Non Final Office Action dated Jun. 15, 2018", 13 pgs.

"U.S. Appl. No. 15/224,383, Final Office Action dated Jan. 14, 2019", 15 pgs.

"U.S. Appl. No. 15/224,383, filed Dec. 5, 2018 to Non Final Office Action dated Jul. 5, 2018", 16 pgs.

"U.S. Appl. No. 15/702,511, Notice of Allowance dated Oct. 26, 2018", 7 pgs.

"U.S. Appl. No. 15/729,582, Final Office Action dated Dec. 13, 2018", 14 pgs.

"U.S. Appl. No. 15/946,990, Non Final Office Action dated Dec. 3, 2018", 10 pgs.

"U.S. Appl. No. 16/204,886, Non Final Office Action dated Jan. 4, 2019", 8 pgs.

"Chinese Application Serial No. 201580076228.1, Office Action dated Jul. 19, 2018", w/ English translation, 19 pgs.

"Chinese Application Serial No. 201580076228.1, Response filed Nov. 26, 2018 to Office Action dated Jul. 19, 2018", w/ English Claims, 16 pgs.

"European Application Serial No. 15870861.0, Response filed Nov. 14, 2018 to Communication Pursuant to Article 94(3) EPC dated Jul. 12, 2018", w/ English Claims, 27 pgs.

"European Application Serial No. 15870861.0, Summons to Attend Oral Proceedings dated Dec. 21, 2018", 5 pgs.

"Korean Application Serial No. 10-2018-7016881, Notice of Preliminary Rejection dated Oct. 19, 2018", w/ English translation, 9 pgs.

"Korean Application Serial No. 10-2018-7016881, Response filed Nov. 30, 2018 to Notice of Preliminary Rejection dated Oct. 19, 2018", w/ English Claims, 27 pgs.

"U.S. Appl. No. 15/152,975, Examiner Interview Summary dated Feb. 4, 2019", 7 pgs.

"U.S. Appl. No. 15/152,975, filed Jan. 28, 2019 to Non Final Office Action dated Sep. 28, 2018", 17 pgs.

"U.S. Appl. No. 15/224,312, filed Feb. 22, 2019 to Non Final Office Action dated Oct. 22, 2018", 14 pgs.

"U.S. Appl. No. 15/224,343, Amendment and Response filed Feb. 4, 2019 to Non Final Office Action dated Sep. 4, 2018", 18 pgs.

"U.S. Appl. No. 15/224,359, filed Feb. 28, 2019 to Non Final Office Action dated Aug. 28, 2018", 16 pgs.

"U.S. Appl. No. 15/224,372, Final Office Action dated Mar. 6, 2019", 17 pgs.

"U.S. Appl. No. 15/224,377, Examiner Interview Summary dated Mar. 4, 2019", 5 pgs.

"U.S. Appl. No. 15/224,377, Final Office Action dated Feb. 6, 2019", 14 pgs.

"U.S. Appl. No. 15/946,990, filed Feb. 20, 2019 to Non Final Office Action dated Dec. 3, 2018", 11 pgs.

"Canadian Application Serial No. 2,910,158, Response filed Dec. 6, 2018 to Office Action dated Jun. 6, 2018", w/ English Claims, 18 pgs.

"Chinese Application Serial No. 201580076228.1, Office Action dated Feb. 12, 2019", w/ English Translation, 18 pgs.

"U.S. Appl. No. 14/634,417, Corrected Notice of Allowability dated Mar. 11, 2019", 3 pgs.

"U.S. Appl. No. 14/634,417, Corrected Notice of Allowability dated Mar. 20, 2019", 3 pgs.

"U.S. Appl. No. 14/967,472, Corrected Notice of Allowability dated Mar. 18, 2019", 3 pgs.

"U.S. Appl. No. 14/967,472, Corrected Notice of Allowability dated Apr. 24, 2019", 3 pgs.

"U.S. Appl. No. 15/074,029, Notice of Allowance dated Jun. 19, 2019", 14 pgs.

"U.S. Appl. No. 15/074,029, filed Apr. 23, 2019 to Non Final Office Action dated Jan. 23, 2019", 15 pgs.

"U.S. Appl. No. 15/152,975, Notice of Allowance dated May 17, 2019", 13 pgs.

"U.S. Appl. No. 15/224,312, Final Office Action dated Apr. 11, 2019", 15 pgs.

"U.S. Appl. No. 15/224,343, Final Office Action dated Mar. 22, 2019", 17 pgs.

"U.S. Appl. No. 15/224,355, filed May 20, 2019 to Non Final Office Action dated Dec. 20, 2018", 13 pgs.

"U.S. Appl. No. 15/224,359, Final Office Action dated Apr. 11, 2019", 15 pgs.

"U.S. Appl. No. 15/224,365, filed Jun. 3, 2019 to Non-Final Office Action dated Jan. 3, 2019", 12 pgs.

"U.S. Appl. No. 15/224,372, filed Jul. 8, 2019 to Final Office Action dated Mar. 6, 2019", 14 pgs.

"U.S. Appl. No. 15/224,377, filed Jun. 6, 2019 to Final Office Action dated Feb. 6, 2019", 10 pgs.

"U.S. Appl. No. 15/224,383, filed May, 14, 2019, to Final Office Action dated Jan. 14, 2019", 15 pgs.

"U.S. Appl. No. 15/702,511, 312 Amendment filed Jun. 26, 2019", 11 pgs.

"U.S. Appl. No. 15/702,511, Notice of Allowance dated Mar. 26, 2019", 7 pgs.

"U.S. Appl. No. 15/729,582, filed May 13, 2019 to Final Office Action dated Dec. 13, 2018", 9 pgs.

"U.S. Appl. No. 15/946,990, Final Office Action dated May 9, 2019", 11 pgs.

"U.S. Appl. No. 15/946,990, filed Jul. 9, 2019 to Final Office Action dated May 9, 2019", 12 pgs.

"U.S. Appl. No. 16/204,886, Notice of Allowance dated May 15, 2019", 9 pgs.

(56) References Cited

OTHER PUBLICATIONS

"U.S. Appl. No. 16/204,886, filed Apr. 2, 2019 to Non Final Office Action dated Jan. 4, 2019", 8 pgs.
"Chinese Application Serial No. 201580076228.1, Response filed Apr. 11, 2019 to Office Action dated Feb. 12, 2019", w/ English Claims, 12 pgs.
"European Application Serial No. 15870861.0, Response filed May 31, 2019 to Summons to Attend Oral Proceedings dated Dec. 21, 2018", w/ English Claims, 23 pgs.
"U.S. Appl. No. 15/074,029, Corrected Notice of Allowability dated Aug. 20, 2019", 10 pages.
"U.S. Appl. No. 15/137,608, Corrected Notice of Allowability dated Oct. 2, 2019", 3 pages.
"U.S. Appl. No. 15/224,312, Advisory Action dated Aug. 27, 2019", 3 pages.
"U.S. Appl. No. 15/224,312, Response filed Aug. 12 2019 to Final Office Action dated Apr. 11 2019", 14 pages.
"U.S. Appl. No. 15/224,343, Response filed Aug. 22, 2019 to Final Office Action dated Mar. 22, 2019", 16 pages.
"U.S. Appl. No. 15/224,355, Final Office Action dated Aug. 9, 2019", 15 pages.
"U.S. Appl. No. 15/224,359, Response filed Sep. 11, 2019 to Final Office Action dated Apr. 11, 2019", 18 pages.
"U.S. Appl. No. 15/224,365, Final Office Action dated Aug. 23 2019", 12 pages.
"U.S. Appl. No. 15/224,383, Non-Final Office Action dated Sep. 23, 2019", 13 pages.
"U.S. Appl. No. 15/702,511, Notice of Allowability dated Sep. 30, 2019", 2 pages.
"U.S. Appl. No. 15/702,511, PTO Response to Rule 312 Communication dated Aug. 13, 2019", 2 pages.
"U.S. Appl. No. 15/729,582, Corrected Notice of Allowability dated Oct. 2, 2019", 3 pages.
"U.S. Appl. No. 15/729,582, Notice of Allowance dated Jul. 22, 2019", 9 pages.
"U.S. Appl. No. 15/946,990, Notice of Allowance dated Sep. 24, 2019", 5 pages.
"U.S. Appl. No, 16/204,886, Corrected Notice of Allowability dated Jul. 15, 2019", 2 pages.
"U.S. Appl. No. 16/204,886, Corrected Notice of Allowability dated Aug. 6, 2019", 2 pages.
"U.S. Appl. No. 16/204,886, Corrected Notice of Allowability dated Sep. 10, 2019", 2 pages.
"U.S. Appl. No. 16/219,577, Restriction Requirement dated Aug. 7, 2019", 6 pages.
"U.S. Appl. No. 16/376,598, Non Final Office Action dated Jul. 25, 2019", 7 pages.
"U.S. Appl. No. 16/511,834, Non-Final Office Action dated Aug. 20, 2019", 11 pages.
"Chinese Application No. 201580076228.1, Decision of Rejection dated Jul. 9, 2019", w/ English Translation, 19 pages.
U.S. Appl. No. 16/529,461 filed Aug. 1, 2019, "Multi Channel System."
U.S. Appl. No. 16/541,919 filed Aug. 15, 2019, "Geo-Fence Authorization Provisioning."
U.S. Appl. No. 16/376,598 filed Apr. 5, 2019, "Gallery of Videos Set to an Audio Time Line."
U.S. Appl. No. 16/511,834 filed Jul. 15, 2019, "Prioritization of Messages Within a Message Collection."

\* cited by examiner

GALLERY OF MESSAGES FROM INDIVIDUALS WITH A SHARED INTEREST

CLAIM OF PRIORITY

This application is a continuation of U.S. application Ser. No. 14/578,258, filed Dec. 19, 2014, which is hereby incorporated by reference in its entirety.

FIELD OF THE INVENTION

This invention relates generally to exchanging electronic messages in a computer network. More particularly, this invention relates to a gallery of messages associated with a shared interest.

BACKGROUND OF THE INVENTION

Mobile devices, such as smartphones, are used to generate messages. The messages may be text messages, photographs (with or without augmenting text) and videos. Users can share such messages with individuals in their social network. However, there is no mechanism for automatically routing a message with content related to a shared interest to a gallery of messages.

SUMMARY OF THE INVENTION

A machine includes a processor and a memory connected to the processor. The memory stores instructions executed by the processor to receive a message and a message parameter indicative of a characteristic of the message, where the message includes a photograph or a video. A determination is made that the message parameter corresponds to a selected gallery, where the selected gallery includes a sequence of photographs or videos. The message is posted to the selected gallery in response to the determination. The selected gallery is supplied in response to a request.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
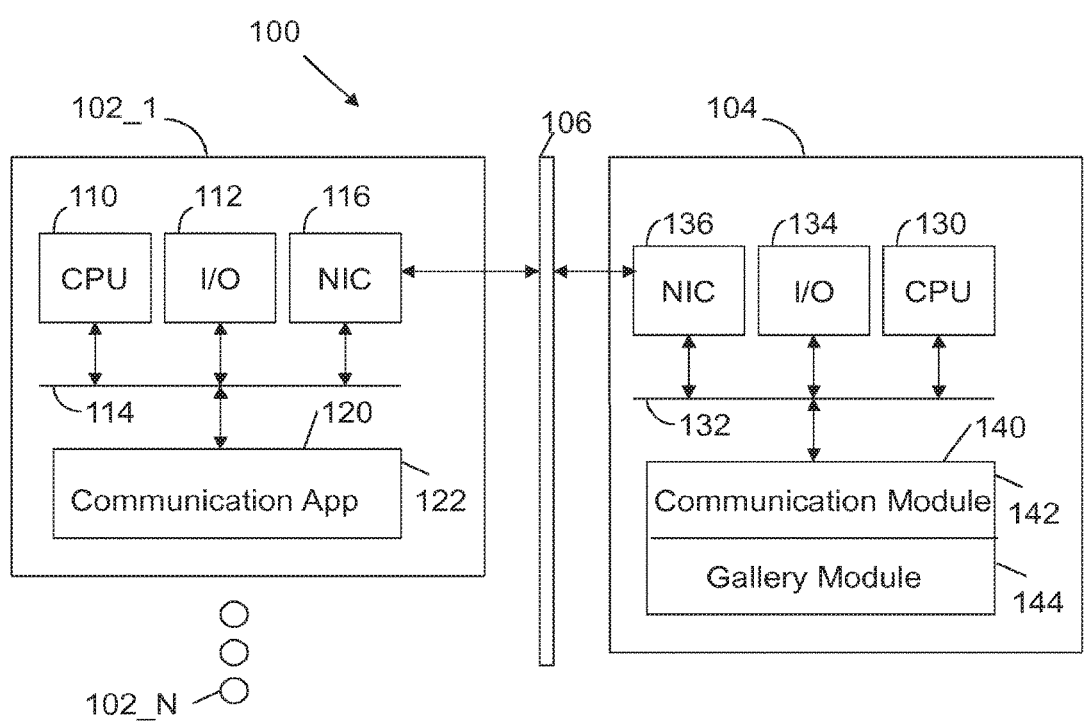
FIG. 1 illustrates a system configured in accordance with an embodiment of the invention.

FIG. 1 illustrates a system 100 configured in accordance with an embodiment of the invention. The system 100 includes a set of client devices 102_1 through 102_N and at least one server 104 connected via a network 106. The network 106 may be any combination of wired or wireless networks.

Each client device 102 has standard components, such as a central processing unit 110 and input/output devices 112 connected via a bus 14. The input/output devices 112 may include a touch display, dedicated control buttons, physical connectors, speakers and the like. A network interface circuit 116 is also connected to the bus 114 and provides connectivity to network 106. A memory 120 is also connected to the bus 114. The memory 120 stores a communication application 122. The communication application 122 includes instructions executed by CPU 110 to coordinate communications with server 104 and/or other client devices. In particular, the communication application 122 is operative with server 104 to exchange messages between client devices. The client device may be in the form of a tablet, smartphone, wearable technology, laptop computer or desktop computer.

The server 104 also includes standard components, such as a central processing unit 130, a bus 132, input/output devices 134 and a network interface circuit 136. A memory 140 is connected to the bus 132. The memory 140 stores a communication module 142. The communication module 142 includes instructions executed by the CPU 130 to coordinate communications with client devices 102. More particularly, the communication module 142 coordinates the exchange of messages between client devices 102. The memory 140 also stores a gallery module 144. The gallery module 144 includes instructions executed by the CPU 130 to store messages from individuals with a shared interest or some other association. Examples of types of associations contemplated by embodiments of the invention include photos or videos taken by users that include the same or similar object(s), such as guitar from a particular manufacturer, a designer handbag, a soft drink or beer can, etc. The messages form a gallery, which may be supplied to a client device 102 in response to a request from a client device 102. The gallery may be a sequence of photographs and/or videos. Any of a text message, user drawings/annotations, animations, photo filters may be associated with a photograph or video (e.g., as an overlay). In one embodiment, the gallery is available for a specified transitory period of time (e.g., a day, during an event, etc.).

Figure 2:
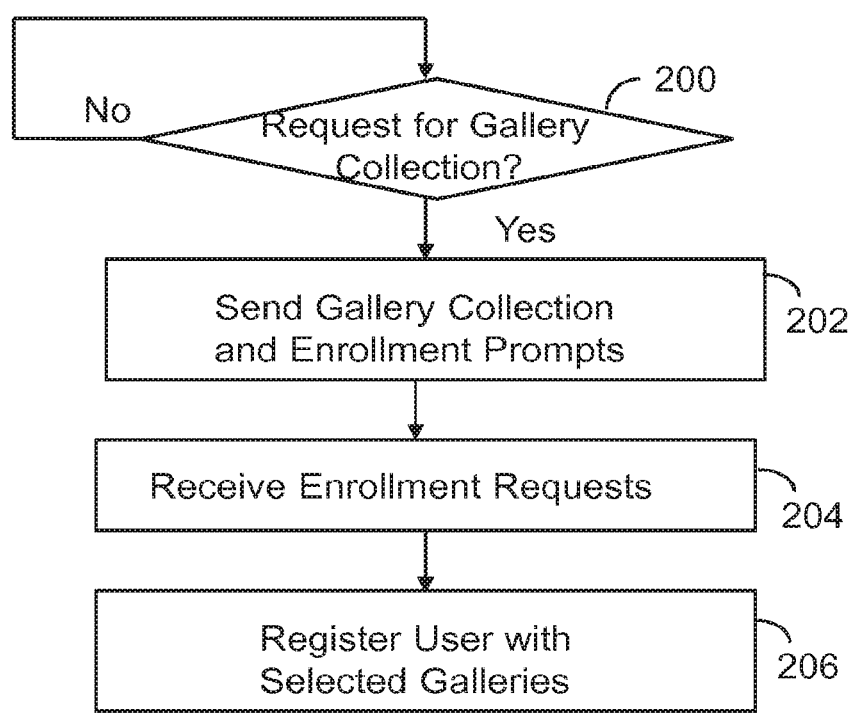
FIG. 2 illustrates a registration process utilized in accordance with an embodiment of the invention.

FIG. 2 illustrates a process for registering users with common interests that desire to participate in posting to a gallery. This process may be implemented by the gallery module 144. The gallery module 144 waits for a request for a gallery collection 200 from a client device 102. In the event of a request (200—Yes), a gallery collection and enrollment prompts 202 are sent from the server 104 to a client device 102.

Embodiments contemplate that a request could include an express request sent by a user. For example, a user may request to participate in a gallery by navigating to a 'request' screen from a user interface on the device display. In these examples, the user may select from any number of existing galleries or create a new gallery by keying in or otherwise describing the gallery. Another example of an express request to participate in a gallery may include an action on the part of the user from an annotation feature offered from an image. For instance, after a picture or image has been taken, some embodiments allow a user to add text, graphics, images, etc. to the picture/video. During this annotation process, the input and detection of a particular key or swipe may be used to indicate an intent to add that picture/video to a particular gallery. As an example, the use of a hashtag ("#") or swipe added to the text "Clippers" may be used to submit the picture/video to a Clippers gallery.

In addition to express user requests to submit content to a gallery, passive requests are also contemplated. For example, the detection of a particular object in a picture or video (detected using, e.g., object recognition processes to detect an object or audio fingerprinting technologies to detect a song, etc.) could be used to prompt a user to join a gallery associated with the object or even automatically post to an existing gallery (e.g., with the user's consent). For example, if a user takes a picture or video of a Coca Cola bottle, upon detection of the bottle, the user may be asked if he or she wishes to participate in a Coca Cola gallery. Alternatively, the user may be asked if he or she wishes to post directly to a gallery without joining. In yet other embodiments, the user's video or picture may be posted directly to the gallery (perhaps after receiving a blanket authorization at some point earlier).

In additional embodiments, a revenue sharing process may be implemented to facilitate payments to the user for use of his or her image. For example, a user image may be added to a gallery sponsored by Coca Cola and in return for contributing to Coca Cola's gallery, a user may receive compensation on a flat-fee, per view or revenue share basis.

Figure 3:
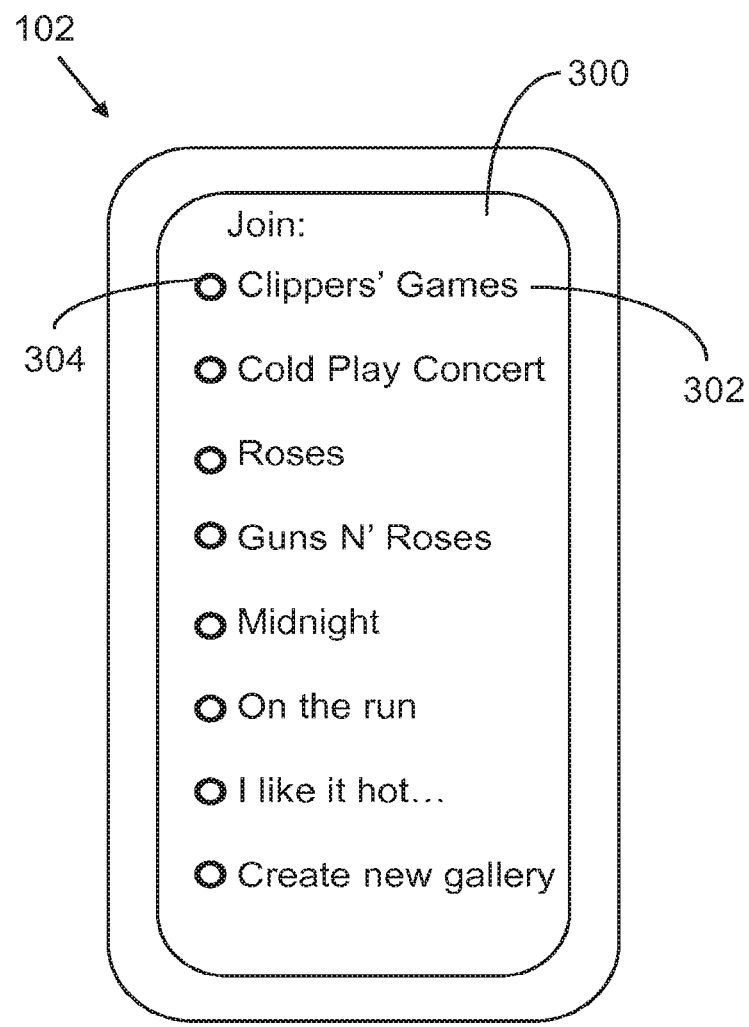
FIG. 3 illustrates a gallery collection with enrollment prompts utilized in accordance with an embodiment of the invention.

FIG. 3 illustrates an example of a gallery collection 300 displayed on a client device 102. The gallery collection 300 may be supplied by activating an icon (such as icon 402 of FIG. 4). Alternately, the gallery may be supplied in accordance with the examples provided above. The gallery collection 300 includes individually listed galleries, such as 302 and an associated prompt 304. In this example, the prompt 304 is a radio button, selection of which results in a selected gallery. Hovering over or tapping the text description 302 of the gallery may result in the display of additional information about the gallery. In the case of "Clippers' Games" a gallery is formed during the course of each basketball game played by the Clippers. Thus, the gallery is a recurring gallery. Messages associated with the Clippers are posted during the course of each basketball game. Thus, a collection of messages is available for the transitory duration of each basketball game. Of course, other examples are also possible including availability for a set amount of time after the event (e.g., twenty-four hours, one week, etc.).

The next example in the gallery collection 300 is a concert. This is a single event gallery that lasts for a set amount of time after the duration of the event. The next example in the gallery collection 300 is for a shared interest in an object, such as roses. This may be an ongoing gallery that is used by registrants to post photographs or videos of roses.

The next example in the gallery collection 300 is for the band Guns N' Roses. This gallery is constructed to receive messages from individuals with a shared interest in the band. In one embodiment, individual songs from the band may be selected. Thereafter, messages that reference or incorporate the individual songs may be posted to the gallery.

The collection may also include a theme such as midnight. Messages generated on or around midnight are posted to the gallery. The messages may be identified by a timestamp associated with the message.

The collection may also include a theme such as "on the run". This gallery is constructed to receive messages from client devices that are in motion (as measured by an accelerometer, gyroscope, GPS signal and the like associated with the client device). Messages from such devices are posted to the gallery.

The collection may also include a theme such as "I like it hot . . . " to post messages when the temperature in a geolocation associated with a message exceeds some threshold (e.g., 90° F.). The geolocation may be where the message is generated. The temperature may be obtained for the specified geolocation by any number of online weather information resources or from a thermometer device built into the device.

A final option shown in FIG. 3 is a request to create a new gallery. Activating the associated radio button 304 may result in a set of prompts that allows a user to define a new gallery. The definition may include a gallery name, keywords associated with the gallery, objects associated with the gallery, and the like.

Returning to FIG. 2, the gallery module 144 receives enrollment or participation requests 204. In response to such requests, a user is registered with one or more selected galleries. Thus, a user registers with one or more selected galleries 206. Thereafter, any message relevant to a selected gallery is automatically routed to the selected gallery. This may be accomplished without the user separately designating the gallery as a destination for the message. A single message may be automatically routed to several galleries if the message has indicia relevant to each of the several galleries.

Figure 4:
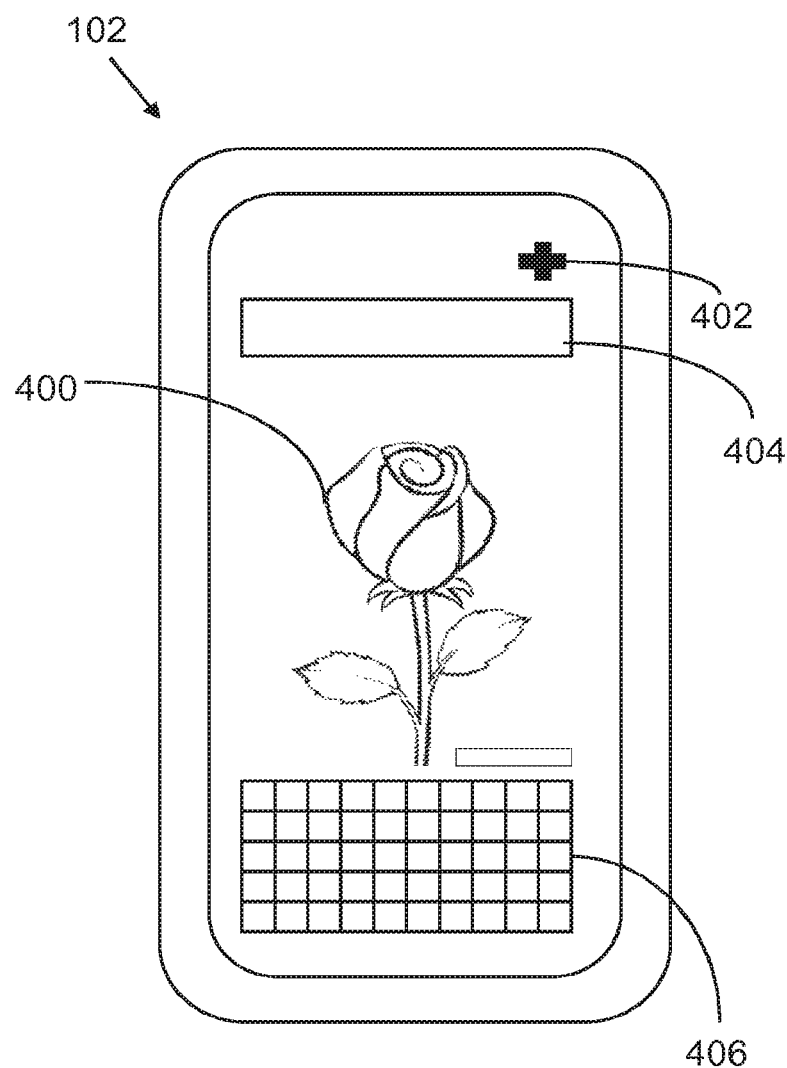
FIG. 4 illustrates a message generation interface utilized in accordance with an embodiment of the invention.

FIG. 4 illustrates a client device 102 that has taken a picture of a rose 400. The communication application 122 and/or gallery module 144 may be configured with instructions executed by the processor to recognize the rose (e.g., machine vision may be used to designate the object as a rose). If the user is registered with the rose gallery, the message is automatically routed to the rose gallery. An icon 402 may be supplied to annotate a message. Activation of the icon 402 may result in a text entry box 404 being supplied, along with a keyboard. The user may designate that the message includes a rose or may type in any other type of message. A message recipient list may be invoked through the icon 402 or through a swiping motion. The message recipient list is an existing list of contacts for the user. Each contact selected will receive a copy of the message via routing through the communication module 142. Thus, for this message there are intentionally designated message recipients. However, depending upon the number of galleries that a user is registered with, the message may be automatically forwarded to relevant galleries without the user designating such galleries for the message.

Figure 5:
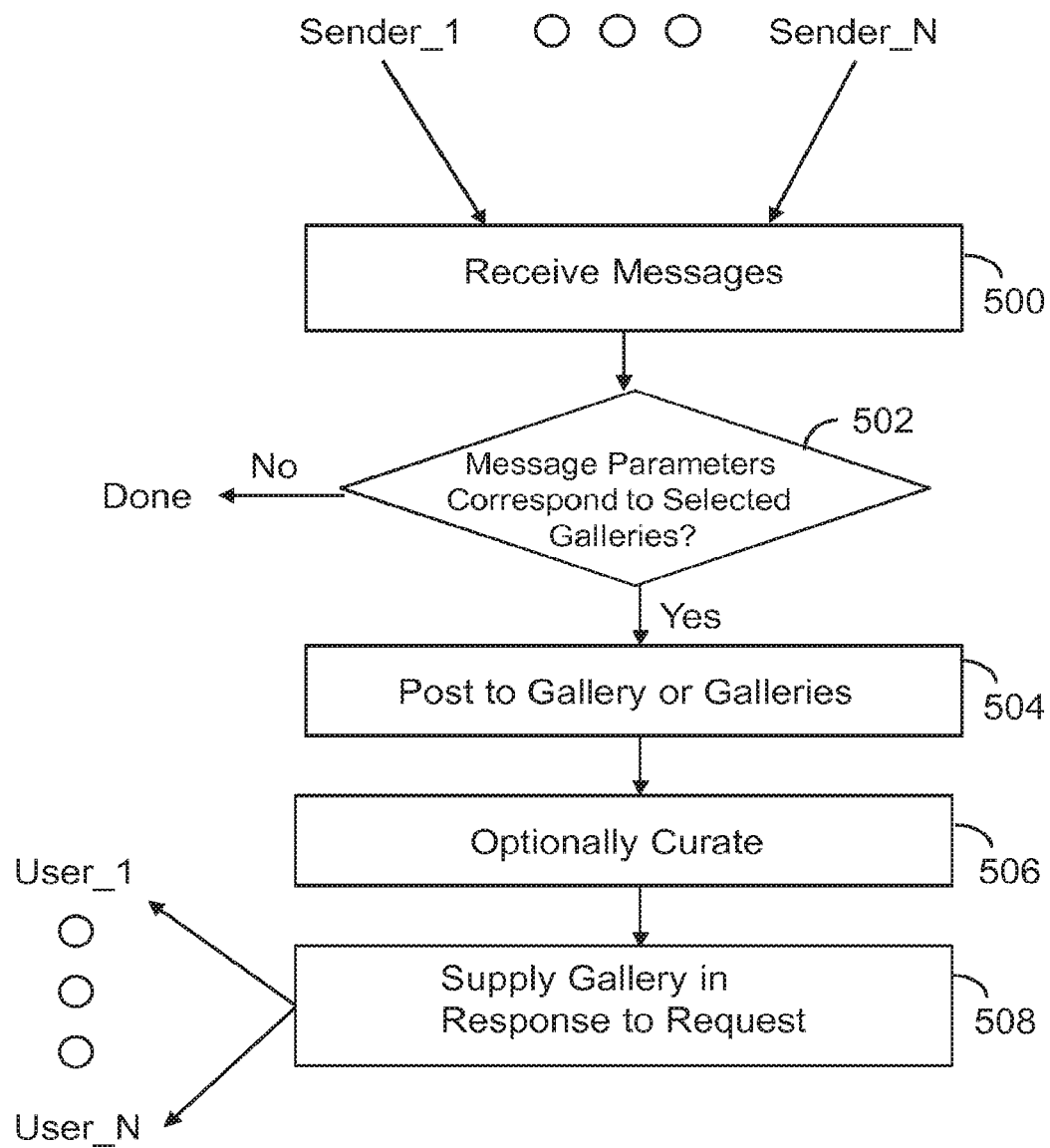
FIG. 5 illustrates server side processing performed in accordance with an embodiment of the invention.

FIG. 5 illustrates operations associated with an embodiment of the gallery module 144. The top of the figure illustrates a set of message senders, i.e., Sender_1 through Sender_N. Each message sender is associated with a client device 102.

The server 104 receives messages 500 from any number of senders. Each message is evaluated to determine whether message parameters correspond to selected galleries 502. For example, if the user has registered for the roses gallery and generates the message shown in FIG. 4, then the message corresponds to a selected gallery (502—Yes). Any number of message parameters may be used. For example, in the case of the rose picture in FIG. 4, the rose may be a designated object from machine vision operations performed by the gallery module. Alternately, or in addition, text associated with the message may be a parameter that is evaluated for relevance to a selected gallery. For example, optical character recognition or word matching techniques may be used to link a message with a gallery. Each gallery may have an associated collection of key words and/or designated objects that are used to determine correspondence between a message and a gallery. Other message parameters may include a time stamp (relevant to the midnight gallery), speed indicia (relevant to the "on the run" gallery) and temperature (relevant to the "I like it hot . . . " gallery).

If the message does not have a parameter relevant to a selected gallery (502—No), then processing by the gallery module 144 is completed. The message is then routed in a standard manner by the communication module 142. If the message does have a parameter corresponding to a selected gallery (502—Yes), the message is posted to one or more galleries 504.

The gallery module 144 may include a curation interface that allows a gallery administrator to optionally curate the gallery 506. For example, the curation interface may allow the administrator to delete inappropriate or redundant messages. Alternately, machine vision and content rules may be used to automatically curate the gallery. In embodiments that include compensation to be paid to a user, the curation interface may be configured to make automatic payments to the users for the use of their pictures or videos. The final operation of FIG. 5 is to supply the gallery in response to requests 508 from any number of users.

Embodiments of the invention utilize galleries with specified transitory periods of time (e.g., a day, or during an event). Each gallery may include individual messages shown in sequence, where the individual messages are photographs or videos. Text may accompany a photograph or video, as shown in connection with FIG. 4.

An embodiment of the invention has a gallery with content set to an audio time line. In some embodiments, the audio time line could be a song or a video clip. As discussed in connection with FIG. 3, a band may have a designated gallery with a selectable song. If a user registers with a song then a message that incorporates the song may be posted to the gallery. Embodiments of the invention utilize short (e.g., 3-6 seconds) video messages. Therefore, a collection of messages can be constructed for different segments of the audio time line associated with a song. As a result, a single song may have an associated mash-up of video segments. Observe here that the audio time line determines the video content. Typically, video content is used to establish a sequence of videos. The use of the audio time line as a guiding factor results in interesting and artistic combinations of videos.

Instead of a song, the audio time line may be a narrative, such as a speech or a dialogue. For example, a "Gettysburg Address" gallery may be formed with a voice over of the famous speech by Abraham Lincoln. Video segments that include words from the speech may be combined to populate a complete audio time line for the speech. Consequently, a voice over of the speech may have an associated mash-up of video segments.

There are known techniques for evaluating audio content. In particular, there are online services, such as Shazam® and Soundhound®, which provide real-time identification of songs and other audio tracks. The gallery module 144 may be configured to access such online services and/or incorporate its own audio fingerprint identification techniques. The object recognition and fingerprinting operations disclosed herein may be performed on any of client device 102, server 104 or a third-party device (not shown).

As described above, embodiments contemplate that a user could be compensated by e.g., the audio time line owner or rights holder for helping to create and promote a particular song or content. Thus, a user that contributes to an audio time line could be compensated by some amount for each viewing of the time line.

Figure 6:
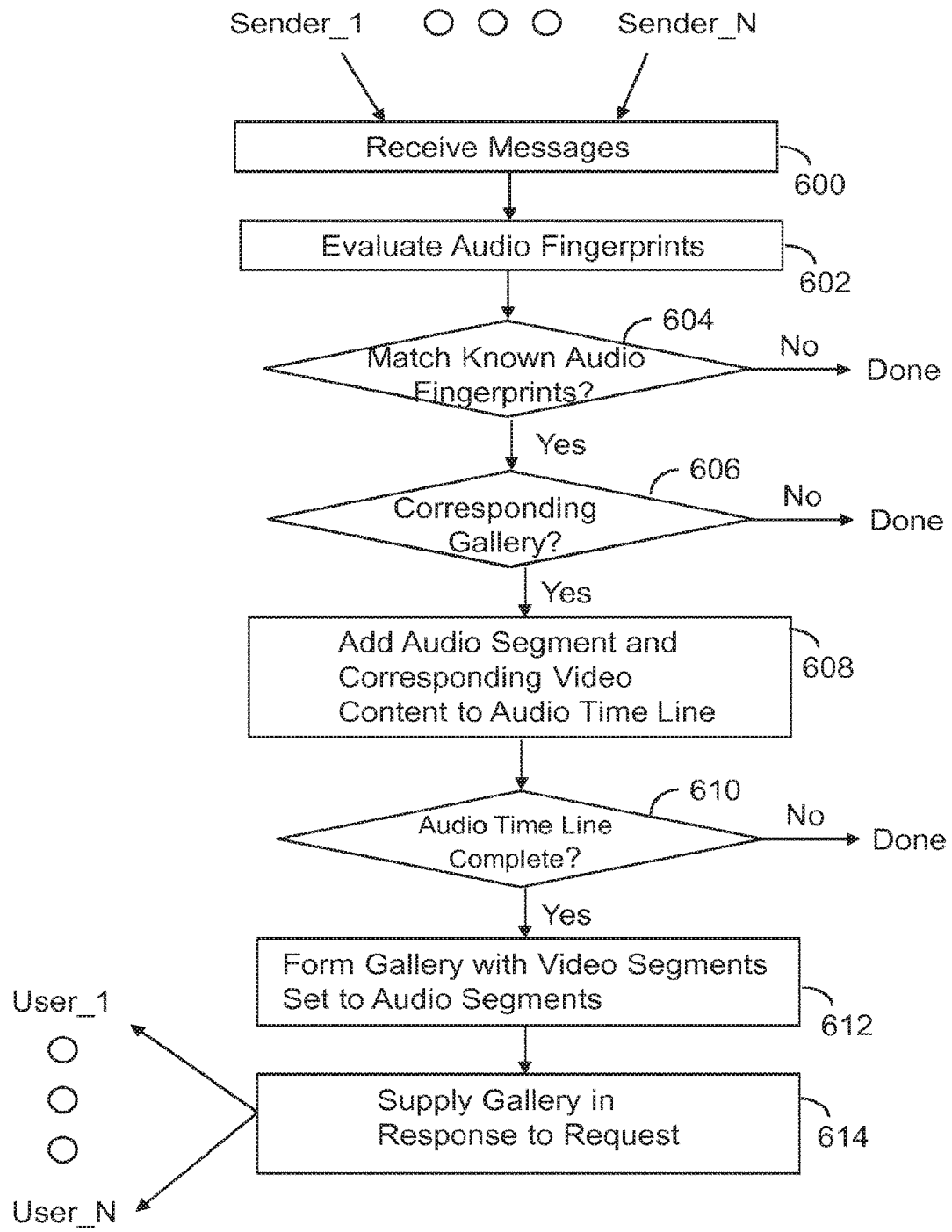
FIG. 6 illustrates server side processing associated with another embodiment of the invention.

FIG. 6 illustrates audio time line processing performed in accordance with an embodiment of the invention. The gallery module 144 receives messages 600 from any number of message senders (Sender_1 through Sender_N). Each message is evaluated for audio fingerprints 602. If there are no matches to known audio fingerprints (604—No), then the gallery module 144 processing is completed and the message is routed in a standard manner using communication module 142.

If matches with known audio fingerprints are established (604—Yes), a determination is made whether there is a selected gallery with the same audio fingerprint. That is, has the message sender registered with a gallery with the same audio fingerprint. If not (606—No), processing is complete. If so (606—Yes), the audio segment and corresponding video content are added to the audio time line 608. For example, the video message may have audio fingerprints for seconds 58 through 66 of a video time line. The video message is then positioned at that location on the video time line.

It is then determined whether the audio time line is complete 610. If not (610—No), the processing of the message is completed and the process may wait for the submission of additional segments for possible inclusion into the audio time line. If so (610—Yes), a gallery is formed with video segments set to audio segments 612. The audio segments may be a master track of a song or narrative. Alternately, the audio segments from the videos themselves may be used. Different criteria may be used to determine whether and audio time line is complete. All time slots in the audio time line need not be filled.

The resultant gallery is then supplied to users in response to requests 614. Thus, users may obtain crowd sourced video mash-ups set to an audio time line.

Those skilled in the art will appreciate that the disclosed techniques provide improved technical results in the field of message combining and sharing. Messages are automatically shared with others that have a common interest, as expressed through a registration process. After the registration process, collections of messages are automatically generated based upon automated evaluation of message content. This automatic process may or may not be executed without a user interface and user input at the server. Thus, an autonomous message combining and sharing system is disclosed that omits the cost of a human operator and is able to operate as fast as a processor operates.

Embodiments of the invention include ephemeral galleries that reduce power consumption and administrative overhead. The ephemeral galleries may be configured for self-execution, for example, by setting message parameters that will establish inclusion in a gallery and setting a transitory gallery period defined by an open time and a close time. The gallery may be associated with a single ephemeral time period (e.g., in the case of a concert) or a recurring ephemeral time period (e.g., in the event of galleries for each basketball game played).

The crowd sourced galleries provide content from many perspectives. An embodiment of the invention establishes innovative video mash-ups set to an audio time line as opposed to a flow of video images. Thus, establishing a novel technique for message combining.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method comprising:
   receiving, at a computing device, a photograph or video;
   receiving, at the computing device, an input and overlaying the input on the photograph or video, the input comprising at least one of text, a drawing, an annotation, an animation, or a photo filter;
   detecting, by the computing device, a gesture indicating an intent to add the photograph or video to one or more predetermined media collections;
   analyzing, by the computing device, the input overlaid on the photograph or video to determine a predetermined media collection to which to add the photograph or video; and
   submitting, by the computing device, the photograph or video comprising the input overlaid on the photograph or video, to be included in the predetermined media collection.

2. The method of claim 1, wherein the input is text indicating a particular media collection to which to add the photograph or video.

3. The method of claim 1, wherein the gesture is a swipe made by a user on an interface of the computing device.

4. The method of claim 1, wherein the photograph or video is subsequently posted to the predetermined media collection and the predetermined media collection is supplied in response to a request.

5. The method of claim 1, wherein before submitting the photograph or video to be included in the predetermined media collection, the method further comprises:
   sending a request to a server to register a user to participate in posting to the predetermined media collection.

6. The method of claim 5, wherein in response to the request to register the user to participate in posting to the predetermined media collection, the user is registered with the predetermined media collection.

7. The method of claim 1, further comprising:
   displaying the predetermined media collection on the computing device.

8. The method of claim 1, further comprising:
   receiving a request to view the predetermined media collection; and
   causing display of the predetermined media collection comprising the photograph or video with the input overlaid on the photograph or video.

9. The method of claim 1, wherein the predetermined media collection is available for a specified transitory period of time.

10. The method of claim 1, wherein the photograph or video is curated before the predetermined media collection is supplied in response to request to view the predetermined media collection.

11. The method of claim 10, wherein the photograph or video is deleted if determined inappropriate or redundant and not included in the predetermined media collection.

12. A computing device comprising:
    a processor; and
    a computer readable medium coupled with the processor, the computer readable medium comprising instructions stored thereon that are executable by the processor to cause the computing device to perform operations comprising:
    receiving a photograph or video;
    receiving an input and overlaying the input on the photograph or video, the input comprising at least one of text, a drawing, an annotation, an animation, or a photo filter;
    detecting a gesture indicating an intent to add the photograph or video to one or more predetermined media collections;
    analyzing the input overlaid on the photograph or video to determine a predetermined media collection to which to add the photograph or video; and
    submitting the photograph or video comprising the input overlaid on the photograph or video, to be included in the predetermined media collection.

13. The computing device of claim 12, wherein the input is text indicating a particular media collection to which to add the photograph or video.

14. The computing device of claim 12, wherein the gesture is a swipe made by a user on an interface of the computing device.

15. The computing device of claim 12, wherein the photograph or video is subsequently posted to the predetermined media collection and the predetermined media collection is supplied in response to a request.

16. The computing device of claim 12, wherein before submitting the photograph or video to be included in the predetermined media collection, the operations further comprise:
    sending a request to a server to register a user to participate in posting to the predetermined media collection.

17. The computing device of claim 16, wherein in response to the request to register the user to participate in posting to the predetermined media collection, the user is registered with the predetermined media collection.

18. The computing device of claim 12, the operations further comprising:
  displaying the predetermined media collection on the computing device.

19. A non-transitory computer readable medium comprising instructions stored thereon that are executable by at least one processor to cause a computing device to perform operations comprising:
  receiving a photograph or video;
  receiving an input and overlaying the input on the photograph or video, the input comprising at least one of text, a drawing, an annotation, an animation, or a photo filter;
  detecting a gesture indicating an intent to add the photograph or video to one or more predetermined media collections;
  analyzing the input overlaid on the photograph or video to determine a predetermined media collection to which to add the photograph or video; and
  submitting the photograph or video comprising the input overlaid on the photograph or video, to be included in the predetermined media collection particular gallery.

20. The non-transitory computer readable medium of claim 19, wherein before submitting the photograph or video to be included in the predetermined media collection, the operations further comprise:
  sending a request to a server to register a user to participate in posting to the predetermined media collection.

\* \* \* \* \*